(12) United States Patent
Wilshinsky

(10) Patent No.: US 12,314,287 B2
(45) Date of Patent: *May 27, 2025

(54) METHOD AND SYSTEM FOR SELF-AGGREGATION OF PERSONAL DATA AND CONTROL THEREOF

(71) Applicant: Murray B. Wilshinsky, Battle Ground, WA (US)

(72) Inventor: Murray B. Wilshinsky, Battle Ground, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,727

(22) Filed: Feb. 15, 2024

(65) Prior Publication Data
US 2024/0193188 A1 Jun. 13, 2024

Related U.S. Application Data

(63) Continuation of application No. 18/182,968, filed on Mar. 13, 2023, now Pat. No. 11,907,266, which is a (Continued)

(51) Int. Cl.
*G06F 16/28* (2019.01)
*G06F 9/451* (2018.01)
(Continued)

(52) U.S. Cl.
CPC ............ *G06F 16/285* (2019.01); *G06F 9/451* (2018.02); *G06F 9/547* (2013.01);
(Continued)

(58) Field of Classification Search
CPC .......................... G06F 16/285; G06F 16/2237
See application file for complete search history.

(56) References Cited

U.S. PATENT DOCUMENTS

| | | | |
|---|---|---|---|
| 6,574,635 B2 | 6/2003 | Stauber et al. | |
| 9,336,302 B1 | 5/2016 | Swamy | |

(Continued)

OTHER PUBLICATIONS

International Search Report and Written Opinion from International Application No. PCT/US2020/063240 dated Mar. 18, 2021.

*Primary Examiner* — Eliyah S. Harper
(74) *Attorney, Agent, or Firm* — GREENBERG TRAURIG, LLP

(57) ABSTRACT

A method includes receiving, by a logic layer processor, over a communication network, from a plurality of electronic resources, initial user personal identifiable information (PII) of a user of a plurality of users. The user PII includes a plurality of data elements. The plurality of data elements of the initial PII of the user are classified to populate a profile map data structure having a standardized predefined data schema of a plurality of vector elements so as to form a user-specific profile map data structure of the user. Additional user personal identifiable information (PII) of the user is iteratively received from the plurality of electronic resources. The additional user PII of the user is iteratively classified to update the user-specific profile map data structure of the user. A plurality of user-specific data management software functions is enabled based on the user-specific profile map data structure.

12 Claims, 18 Drawing Sheets

Related U.S. Application Data continuation of application No. 17/507,457, filed on Oct. 21, 2021, now Pat. No. 11,636,136, which is a continuation of application No. 17/111,840, filed on Dec. 4, 2020, now Pat. No. 11,157,525.

(60) Provisional application No. 62/943,871, filed on Dec. 5, 2019.

(51) Int. Cl.
*G06F 9/54* (2006.01)
*G06F 16/22* (2019.01)
*G06F 21/62* (2013.01)

(52) U.S. Cl.
CPC ........ *G06F 16/2237* (2019.01); *G06F 16/287* (2019.01); *G06F 21/6254* (2013.01)

(56) References Cited

U.S. PATENT DOCUMENTS

| | | | | |
|---|---|---|---|---|
| 10,645,109 B1* | 5/2020 | Lin | ............... | G06N 5/047 |
| 11,481,553 B1* | 10/2022 | Durvasula | ............. | G06F 40/279 |
| 11,481,642 B2* | 10/2022 | Pais | ................ | G06F 16/90332 |
| 11,531,858 B2* | 12/2022 | Khabiri | ............. | G06F 16/24522 |
| 11,562,315 B2* | 1/2023 | Subramanian | .......... | G06Q 40/12 |
| 11,562,439 B2* | 1/2023 | Goyal | .................... | G06Q 40/12 |
| 11,580,471 B2* | 2/2023 | Karmakar | .............. | G06Q 30/02 |
| 2003/0028451 A1* | 2/2003 | Ananian | ............. | G06Q 30/0615 |
| | | | | 705/26.42 |
| 2007/0156694 A1* | 7/2007 | Lim | ...................... | G06F 16/176 |
| | | | | 707/999.009 |
| 2009/0048977 A1 | 2/2009 | Aggarwal et al. | | |
| 2009/0240568 A1 | 9/2009 | Ramer et al. | | |
| 2010/0138370 A1* | 6/2010 | Wu | ....................... | H04H 60/33 |
| | | | | 707/769 |
| 2013/0185293 A1* | 7/2013 | Boback | ............. | G06F 16/24578 |
| | | | | 707/755 |
| 2014/0089334 A1* | 3/2014 | Adibi | ................. | G06F 16/2465 |
| | | | | 707/758 |
| 2017/0286717 A1* | 10/2017 | Khi | ...................... | H04W 12/10 |
| 2018/0004978 A1 | 1/2018 | Hebert et al. | | |
| 2018/0307859 A1 | 10/2018 | LaFever et al. | | |
| 2019/0080063 A1* | 3/2019 | Rice | .................... | G06F 21/6245 |
| 2019/0102574 A1* | 4/2019 | Roberts | ................ | G06F 16/221 |
| 2019/0102802 A1* | 4/2019 | Tuschman | .............. | G06N 20/20 |
| 2019/0312941 A1* | 10/2019 | Maccini | ................. | H04H 60/88 |
| 2019/0332807 A1 | 10/2019 | LaFever et al. | | |
| 2020/0074104 A1* | 3/2020 | Sommerville | ...... | G06F 21/6227 |
| 2020/0349468 A1* | 11/2020 | Arya | .................... | G06F 18/214 |

\* cited by examiner

METHOD AND SYSTEM FOR SELF-AGGREGATION OF PERSONAL DATA AND CONTROL THEREOF

FIELD OF TECHNOLOGY

The disclosure generally relates to personal information management and, more particularly, to a method and system for self-aggregation of personal data and control thereof.

BACKGROUND OF TECHNOLOGY

Today, many products and services from different entities may need detailed user data known as Personal Identifiable Information (PII) that needs to be verifiable (or verified). These entities may include Government agencies, NGOs, providers of financial related professional services (CPA to CFPs) service, credit card companies, as well as other consumer lenders and especially home mortgages, borrowers' secured consumer lenders from car loans and leasing, Home Equity lines of credits, and the largest of all markets—consumer Mortgage lenders.

Two trends have created a fundamental conflict for both the user and the providers of the products and services mentioned above. The first trend is the evolution of laws relating to the rights that a user has to their PII and regulatory compliance requirements. New legal and regulatory frameworks have created a fundamental change in how PII needs to be treated and who has rights to it. Both on a Federal and State level, laws are on the books or are in legislation. The EU Law General Data Protection Act also known as GDPR has accelerated this evolution of consumer rights both prompting new legislation in other countries and jurisdiction (e.g. California Consumer Protection Act), as well as high consumer awareness of how their data is used and the rights they have over their PII data used by companies. The second trend is user perceptions regarding how their PII is being used.

Users across all demographics may increasingly use digital means as a way to shop for services and/or products. Users may have an expectation of ease of use and convenience in every product or service they are offered. In addition, users want personalized and/or customized offers that address their particular needs, preferences, etc. This may affect many different companies in various industries and the methods these companies can use to offer their products or services. Two of the primary users of PII data are the Banking and Financial Services Industry. One of the fastest growing sectors is financial technology sector, known as Fintech.

These companies may use the user's PII of a particular user to determine what products that a company may be able to provide and if the company may provide them to user based on evaluating the user's PII. Of the industries that use the user's PII, the home mortgage industry may have the most acute challenges. This is due to the extensive set of the PII data required as well as assuring the accuracy and validity of the PII data, and the fact that it affects so many users (either who have or want to have a home with a mortgage). The financial sums from new applications may exceed a trillion dollars every year.

The conflicting factors mentioned above may be evident in the mortgage process. For example, a user (borrower) may need to fill out a loan application information. The loan application data may use information based on the dataset from the Government Sponsored Entity Form commonly known as the FNMA 1003, for example. The user may need to provide supporting documentation to substantiate, or to validate this information. This is often an incremental serial process that is time intensive for both the consumer and the lender.

Historically, verification was done using a series of direct verification forms for each data point, e.g. Verification of Mortgage (VOM), Verification of Employment (VOE) (e.g., income), and Verification of Deposit (VOD), for example. The industry adopted two trends for speeding up the process (at the time it was over 60 days from application to funding a mortgage), partially substituting those verification forms with electronically provided data from trusted parties.

Before going through the validation process, a common practice is to "pre-qualify", which may be indicative of the statistical probability that the lender may provide the loan to the user. However, given the new PII regulatory landscape, even with the prequalification data, the lender may bear liability if the user's PII is not handled in a regulatory compliant secure and private manner.

Once the lender prequalifies the user, and the user wants to obtain the loan offered, the lender may initiate loan processing and loan underwriting. These stages may be the most time intensive for both the borrower (user) and the lender. The primary objective is to collect a complete set of the user's data, validate the user's data, and then analyze the user's data. The lender may assess whether the loan may be offered to the user after the dataset of the user's data is complete, verified, and analyzed. This whole process may be expensive and may cost $7000 on the average (in 2018), for example, for a home mortgage. The acquisition of the required user information as well as the methods for validating the user's information has been standardized by the Government Sponsored Entities (GSE) commonly known as Fannie Mae (FNMA Federal National Mortgage Association) and Freddy Mac (FNMC Federal National Mortgage Corporation) over the past 30 years. In recent years, new initiatives may broadly standardize the data formats such as for example, the Mortgage Industry Standards Maintenance Organization (MISMO®), and the Industry Loan Application Dataset (iLAD), which is a supplemental specification to the Fannie Mae®/Freddie Mac® specification—Uniform Loan Application Dataset (ULAD). These initiatives are being done since the data collection and verification process are so problematic.

The data collection and verification problem may be more difficult for the borrower, as they often have to go through a repetitious process of collecting data, collaborating documentation and explanations. This process can be both time-consuming as well as frustrating for the borrower. This is also a significant component of the Lender cost to create a loan mentioned above.

Therefore, there may be a need in the financial industry for a procedure for expediting and facilitating the processing of financial transactions and loans. Collecting, validation and conveyance of an extensive set of PII data to the Financial Services and Banking industry sectors, while allowing the consumer the control and transparency they want and that complies with the regulatory requirements of handling this data for the benefit of both the consumer and the broad scope of industry sectors that need the consumer PII.

There may be a need in the financial industry for a procedure for expediting and facilitating the collection, validation, and processing of a consumers' PII and sharing it with the Financial Services and Banking industry sectors, while allowing the consumer to maintain control of the data. This provides the transparency consumers need and provide the Enterprise with an environment and data set that is both validated. This reduces the cost of the Enterprise's compliance with PII related regulations, which benefits both the consumer and Enterprises in a broad scope of industry sectors that use consumer PII.

SUMMARY OF DESCRIBED SUBJECT MATTER

In some embodiments, the present disclosure provides an exemplary technically improved computer-based method that includes at least the following steps of receiving, by a logic layer processor, over a communication network, from a plurality of electronic resources, initial user personal identifiable information (PII) of a user of a plurality of users, where user PII may include a plurality of data elements. The plurality of data elements of the initial PII of the user may be classified to populate a profile map data structure having a standardized predefined data schema of a plurality of vector elements so as to form a user-specific profile map data structure of the user, that may include at least a plurality of: (i) a demographic user-specific parameter, (ii) a psychographic user-specific parameter, (iii) a behavioral user-specific parameter, (iv) a quantitative user-specific parameter, or (v) any combination thereof. Additional user personal identifiable information (PII) of the user based at least in part on the user-specific profile map data structure may be iteratively received over the communication network, from the plurality of electronic resources. The additional user PII of the user may be iteratively classified to update the user-specific profile map data structure of the user. A plurality of user-specific data management software functions may be enabled based on the user-specific profile map data structure.

In some embodiments, the present disclosure provides an exemplary technically improved computer-based system that may include a non-transitory memory and at least one logic layer processor. The at least one logic layer processor may be configured to execute computer code stored in the memory that causes the at least one processor to receive over a communication network, from a plurality of electronic resources, initial user personal identifiable information (PII) of a user of a plurality of users, where user PII may include a plurality of data elements, to classify the plurality of data elements of the initial PII of the user to populate a profile map data structure having a standardized predefined data schema of a plurality of vector elements so as to form a user-specific profile map data structure of the user, that may include at least a plurality of: (i) a demographic user-specific parameter, (ii) a psychographic user-specific parameter, (iii) a behavioral user-specific parameter, (iv) a quantitative user-specific parameter, or (v) any combination thereof, to iteratively receive over the communication network, from the plurality of electronic resources, additional user personal identifiable information (PII) of the user based at least in part on the user-specific profile map data structure, to iteratively classify the additional user PII of the user to update the user-specific profile map data structure of the user, and to enable a plurality of user-specific data management software functions based on the user-specific profile map data structure.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
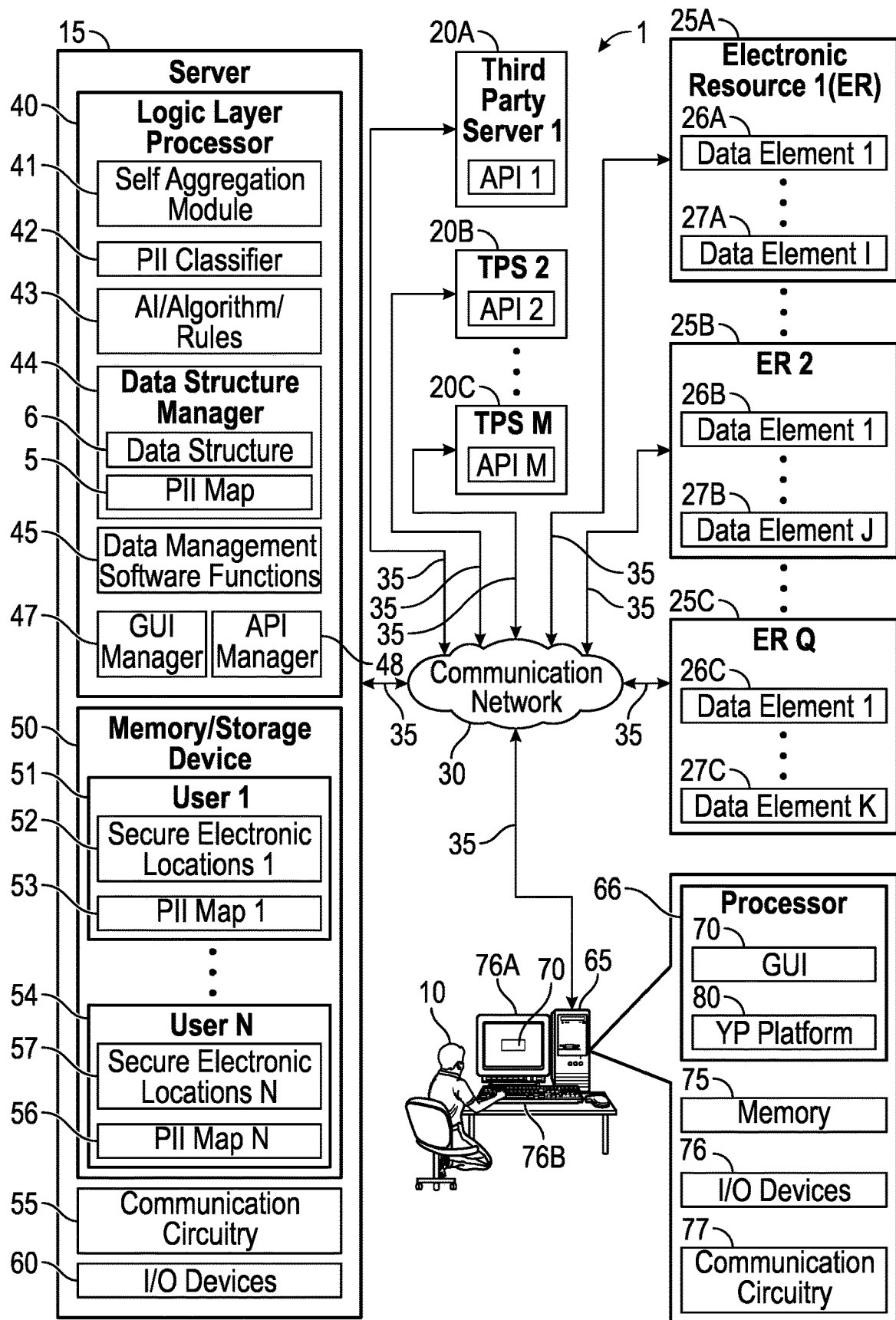
FIG. 1 depicts a system for self-aggregation of personal data of a user and personal data custody, control, and stewardship in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

As used herein, the acronym PII may refer to Personal Identifiable Information. PII is information which may be used to distinguish or trace an individual's identity, such as their name, social security number, biometric records, etc. alone, or when combined with other personal or identifying information, which may be linked or linkable to a specific individual, such as date and place of birth, mother's maiden name, etc. PII may be data obtained in data aggregation steps using credit reports, social media, and user inputs, for example.

As used herein, a PII MAP may be a machine automated presentation of a user's PII which may include data pertaining to the primary values of the user's PII and various metadata on the user's PII. This may be a stored set of raw data, files, and/or various metadata. This data and their sources may include, for example, bank statements, Tax returns, credit card statements, Purchase histories, Medical records, picture ID, etc. The metadata types may include: descriptive metadata, structural metadata, administrative metadata, reference metadata, and/or statistical metadata.

As used herein, PII PRINT may refer to an export of the PII MAP and may be in a flat file format, image (like a Barcode or QR code), and/or a database that is a subset of the PII MAP. The data in the flat file, the database, and/or represented in the Bar Code or QR Code may be raw, anonymized, and/or synthetic. This may provide a method for the analysis of the user's PII data by a third party without the user needing to share actual personal data or by the third-party taking possession of or controlling the data regulated as PII.

As used herein, the terms "Your PII", "YP platform", or "YP", may synonymously refer to the platform performing the method for self-aggregation of personal data and for self-aggregation of personal data of a user and personal data custody, and/or control, and/or stewardship using the PII MAP.

The embodiments disclosed herein may relate to a user's interaction with the financial services industry, financial institutions, companies in other industry verticals and/or professional service providers (e.g., that may require the user's PII service and/or related non-governmental organizations (NGO) and government offices. Stated differently, this may be a provider of goods or services that may need an extended set of the consumer's PII to qualify the user for providing the product or service to the user.

The disclosed embodiments may provide methods and systems for expediting and facilitating the processing, offering, and provisioning of financial transactions, loan products, and/or services that may require multiple points of data considered to be PII to the user, all while allowing the user to retain better control of their PII data.

One industry vertical that may require the largest set of PII data is home mortgages. Borrowers may need to provide loan application information and documentation to each lender every time a loan is requested. Similarly, for each application, lenders may need to incrementally collect and verify data before receiving a determination if the borrower qualifies for the loan. Financial institutions may need to repeat the process of incremental data collection with validation for each borrower and for each loan, which is very inefficient. Therefore, there may be a need in the financial industry for a procedure for expediting and facilitating the processing of financial transactions, interactions, and loans, or managing personal data in any industry vertical. The technical solution as provided in the embodiments disclosed herein solves these problems.

Embodiments of the present disclosure herein describe methods and systems for creating an electronic account for identifying, retrieving, processing, storing and/or providing individually defined access to personal identifiable information (PII) of a specified user. At least one secure electronic location may be configured for storage of the specific user's personal identifiable information and for synchronizing the secure electronic location with the electronic account to control the secure electronic location. The personal identifiable information may be aggregated via the electronic account for storage in at least one secure electronic location, and for processing and accessing via the electronic account along with details of the manner in which each point of the personal identifiable information as well as other metadata was verified including the storage location. The data held within the personal identifiable information may be extracting, analyzing, classifying or encrypting data via the electronic account. A data structure may be generated based on an analysis of the data via the electronic account where each element in the data structure may represent a unique value. A profile of the specified user may be created by analysis of the personal identifiable information. Data may be extracted for transactions involving the specified user.

The system may further allow selective access by designated persons to specified data or objects in at one secure electronic location or specified elements in the data structure. With the embodiments disclosed herein, users may be in control of their own PII data. Financial service providers may have cost effective, on-demand access to the user's PII data, and may access complete user data with validation.

In some embodiments, once a PII MAP is generated for the user from the data held in at least one secure location, it may be accessed and used by multiple enterprises based on the permission granted to the consumer enterprises based on the permission granted by the user. Note that consumer enterprises may be provider user. The secure electronic location may provide a central safe and trusted place to store all of the user's personal records (e.g., financial, medical, etc). This may enable a user to use a single resource to provide their validated PII data directly to third parties, such as into a lender's loan origination system. For example, commercial users such as Bank of American, Chase, and Capital One, for example, to whom the user has granted permission for that instant (transaction) populate their ASCII, file data and validation data to via an API, which may be imported directly into their Ellie MAE loan origination system (LOS) software platform. As a result, the lender, for example, may be able to prequalify loan applicants with better quality data and less regulatory liability. Furthermore, the user may be educated with personally tailored educational material information about loans, budgeting, etc.

The result may be a consumer-focused, multi-faceted distributed database including direct data inputs, as well as images and/or PDF files either inputted directly by the consumer or derived from documentation provided by the consumer or from third party verification services authorized by the user or generated by the user's use of the application. Standard datasets may be used, such as Industry Loan Application Dataset (iLAD), Uniform Residential Loan Application (URLA), Uniform Loan Application Dataset (ULAD), and Mortgage Industry Standards Maintenance Organization (MISMO), for example. By utilizing optical character recognition (OCR) and artificial intelligence (AI), data may be extracted from tax returns, bank statements, and other financial documents, which may have been validated by 3rd parties. Each process date may be marked. The data may be stored in immutable storage media and/or in blockchain dataset(s) to better ensure accuracy.

Note that from a particular PDF from a particular consumer's Bank statement file, for example, the artificial intelligence (AI) engine may have the context provided by the PIIMAP to interpret the data in the file and extract it to the PII MAP, as well as to tag the PDF file itself for storage and retrieval. There may be a number of companies and technologies that that may read and extract data from financial PDF documents, but there may be limits in the accuracy of AI models even when they are trained due many Natural Language Processing (NLP) issues, for example. However, the YP platform may allow the financial PDFs, for example, to be interoperated and processed within the context of the PII map.

The software implemented method may include expediting and facilitating the collection, validation, processing of the user's PII, and sharing data to facilitate transactions involving personal identifiable information of a specified user. The software implemented method may further include expediting and facilitating the collection, validation, and processing of a user's PII and sharing data to facilitate transactions involving PII of a specified user.

In some embodiments, a distributed virtual storage location over at least one secure electronic location for the storage of the personal identifiable information relevant to the specified user may be configured. The at least one secure electronic location may be synchronized with the electronic account such that the electronic account may control the at least one secure electronic location.

In some embodiments, the consumer may control the user's conditional tiered storage such that the consumer's 2017 1040 tax return may be stored in an immutable storage media and/or in blockchain dataset where latency may not be a top priority. In contrast, the user's FaceBook and/or Linkedin data may be stored in Read/Write storage media that has very low latency and a security layer. In other embodiments, the user may choose to have data stored in at least one particular location such as their external hard drive, or cloud storage accounts such as Google Drive and/or MS OneDrive accounts, for example.

In some embodiments, the "profile" of the user, represented by a data structure, may be generated in at least one format. The at least one format may include Raw Data. In a financial use case, for example, this may be the information that a bank underwriter may read—this is what is originally aggregated, anonymized or pseudonymization where personal identifiers may be masked, for example, as well as synthetic data, which is a subset of anonymized data that may be machine generated.

In some embodiments, the data about the user may be obtained from raw data about the consumer, extracted data from financial documentation of the specified user, extracted data from online accounts or providers, and/or data inputted from the user.

In some embodiments, the system for self-aggregation of personal data and for self-aggregation of personal data of a user and personal data custody, control, and stewardship may allow the user to maintain control of the user's personal identifiable information, such that no one can access the user's PII unless the user first authorizes access to a person, entity and/or any suitable third party. The self-aggregation of the user's PII from a plurality of electronic resources may include collecting information from online accounts pertaining to the specified user. The system may further provide storing details of a manner of verification that may include the name of entity providing verification, type of verification, and date of verification for each point of the user's PII. Specifically, during the verification process, the system may record and maintain the manner of verification and date on which the information was verified. For example, "on 1 Feb. 2019, the 2018 1040 IRS Tax return was verified by the Income Verification Express Service (IVES) Program".

In some embodiments, an entity may include any individual, group of people, non-profit organization, governmental organization, corporation, liability limited corporation (LLC), sole proprietor, and/or foreign entity that provides products and/or services as well as advice, governmental benefits, social benefits, third party benefits, for example. The entity that may need specific data with PII of a user to be able to provide the user with products and/or services. The entity may include a utility company, educational institution, healthcare company, insurance company, mortgage loan company, for example. The entity may refer to an approved provider in the marketplace, such that the entity may receive the user's PII through an API (application processing interface) or a YP Form Application Wizard.

In some embodiments, the entity may also include a provider user, who may be an approved provider in the marketplace, such as consumer enterprises. The entity may also include commercial users that may not be in the market place, but either may receive a data export and/or a qualified/targeted lead via an API or the YOURPII, such as to automatically fill out the online form for the consumer, for example. In other embodiments, a data export may include a qualified/targeted lead.

In some embodiments, the self-aggregation of the user's PII from the plurality of electronic resources may include uploading images or PDF files of financial documents, such as for example, bank and credit card statements, appraisal documents, home inspection documents, signed contracts, disclosure forms, driver's license, tax returns, W-2 and 1099 forms, pay stubs, and/or other financial-related documents.

In some embodiments, the method for the self-aggregation of personal data and for self-aggregation of personal data of a user and personal data custody, control, and stewardship may provide creating, in at least one secure electronic location, multiple segments for storage of defined types of information each in a dedicated storage segment. For example, dedicated segments of data may be stored in electronic locations based on the type of dedicated segment and/or other factors. The dedicated segments may include, for example, segments dedicated to income, assets, liabilities, financial statements, tax documents, completed loan applications, validation, and/or ratio metrics.

In some embodiments, the method for the self-aggregation of personal data and for self-aggregation of personal data of a user and personal data custody, control, and stewardship may provide creating, in the at least one secure electronic location, segments for data to be stored in immutable storage media, or to be stored in mutable storage media based on the nature or type of the information stored in the data. Immutable data may include data that does not change, such as W2 and 1099 forms and tax returns. Mutable data may include variable data like a bank account or credit card current balance.

The dedicated segments may include segments for data to be stored in an immutable format (Write once/Read only Memory and/or a Blockchain). This may include data and/or objects related to historic information that may be significant, such as income from a previous year. This may be represented as an object such as a W2 form or 1040 form in a PDF data file from a verified source, such as the Internal Revenue Service (IRS), or a digital version of a Verification of Employment from their employer. Some data, such as a bank account balance, may be stored in a mutable format in a random-access memory (RAM), solid state drive (SSD), and/or a hard disk drive (HDD).

In some embodiments, in the same manner that the data is structured as described above, there may be a similar need for segmenting the data based on data specifications which may be alternatively referred to as classification (in laymen terms). For example, there may be a number of data specifications, including the Industry Loan Application Dataset (iLAD), which was just resealed by the Mortgage Industry Standards Maintenance Organization (MISMO®), Uniform Loan Application Dataset (ULAD) developed by Government Sponsored Entities (GSE), for example, Fannie Mae, Freddie Mac, and Ginnie Mae other specification include an alphabet soup MISMO, URLA, AUS, DU, LPA. Some data that was once recorded may not require updating (e.g. 1040 document). However, other data may need to be periodically updated (e.g., current bank balance). These different types of data may be classified accordingly, and subsequently may be stored differently.

In some embodiments, metadata (tags) may be used to dynamically determine how and where the data is stored as well as how the particular data type/value may relate to a particular data schema. When data needs to be exported to a particular schema, YP may export or translate the data to any standardized predefined data schema.

In some embodiments, the system may further classify the data according to various industry specifications. These industry specifications may define the syntax of XML or other data to make the data usable by various systems such that any third-party software may be able to read data, for example, in a mortgage file. The standard FNMA mortgage application called the FNMA 1003, each data field in the application such as name, monthly income, years at current position, occupation, name of employer, for example, has a unique code which are defined in these specifications, in addition to many other parameters, including the format/syntax of the data output.

In completing generic web form, such as a loan application, for example, there may be different scenarios. On the web, a lender may have an online form as their loan application. In some embodiments, the YP platform may automatically populate the fields so as to automatically "fill out" that form with the user's personal identifiable information.

In some embodiments, a mortgage lender may receive a full dataset of the user's PII exported from the YP platform with the user's consent given via the YP platform. The user's PII data may then be relayed directly into the lender's Loan Origination system (LOS). For example, the annual income value of $XX,XXX may be coded, labeled, and tagged per the industry specifications, so LOS systems may automatically identify this field format as the annual income field value. The YP platform may further relay information to the LOS system that this income value of $XX,XXX was verified by an IRS verification of a specific income service and/or some other verification methods. In some embodiments, some of the user's PII may be coded, labeled, and/or tagged by the YP platform with more granularly than the industry specifications, but there may be many data points included in the industry specifications. The YP platform may analyze, segment, and/or store the data differently based on these specifications. In addition, the system may create a translator to map the user's PII coded, labeled, and/or tagged to any industry specification.

In some embodiments, extracting and analyzing the data within the personal identifiable information may be based on specific predefined criteria.

In some embodiments, the method may include creating a optimized user interface for the user based on data structure values (e.g., demographic, psychographic, behavioral and/or quantitative user-specific parameters). Changes to the data structure values may generate corresponding changes to the customized interface whenever necessary.

In some embodiments, the system may calculate financial ratios from the extracted data. Additionally, the system may calculate ratios of two or more values that a third party commercial provider may deem valuable. Any other desirable ratios, formulae, and/or equations may be created and, utilizing certain factors as assumptions (e.g., loan amount, loan term), industry standard ratios may be generated and stored as synthetic data.

In some embodiments, the extracted data may be used for loans and financial transactions. The extracted data may include bank and credit card statements, tax returns, W-2 and 1099 forms, pay stubs, or other financial-related documents.

In some embodiments, the extracted data may be inserted into pertinent fields on digital forms. In particular, the method involves inserting said extracted data into pertinent fields and populate this in an online form, or third-party software application through an API (application processing interface). Preferably, this involves dynamically exporting data sets from the secure location or matrix for export to an Application Programming Interface.

Additionally, the method for self-aggregation of personal data and for self-aggregation of personal data of a user and personal data custody, control, and stewardship may be used for prequalifying persons for a financial transaction based on the analysis of the data. For example, an output of the above-mentioned analysis of the data and liquidity ratio assumptions (as described hereinbelow) may be needed if synthetic data is not used for prequalifying persons for a financial transaction. However, persons may be prequalified for a financial transaction based on synthetic data that may include predetermined ratios, as described hereinabove.

In some embodiments, the provider user may identify users that may "prequalify" for goods and services. If a Provider User such as a Mortgage Lender may look for potential customers who have a Debt to Income Ratio of Y % and a Liquidity Reserve of X. The system may search for a Unique ID #that is in both cohorts. Some of these values may be dynamic such that only the Liquidity Reserve Ratio may be calculated if the monthly mortgage payment and their total Liquid assets of potential borrowers are known.

In some embodiments, the system may perform a query of a particular PIIMAP on the fly (known herein as a a "Pre Tagged" method) even though the value of the assumed monthly mortgage payment is not known. The lender may want to use the system that may generate a standard unit e.g., create a standard unit such as $1,000, if the Mortgage bank is assuming a monthly mortgage payment of $3,000. The mortgage back may only want to solicit a potential borrower that has 3 months of liquidity reserves, then the consumer user in the system with a score of 9 or higher is desirable. There are 9 units of Value in their liquid assets, divided by 3 (because $3,000 is 3× the $1,000 unit) which equals 3, or the number of months of reserves based on $3000 per month.

In some embodiments, the system may run many different scenarios such as how long the potential borrower lived in their home, had a mortgage, debt to income ratio, have a car lease, had medical emergency and/or surgery, watches certain streaming channels, etc. such that all the users fitting each scenario. The system may create a "cohort". For example, an exemplary cohort may be created from consumers that have an Estimated Debt to Income Ration of 30% to 35%, consumers with a "liquidity reserve" of 3 months of mortgage payments (e.g. their liquid assets equal 3 months of mortgage payments), and consumer having their mortgage for over 5 years. Each Cohort may have a list of pointers to a internal unique system ID for each consumer user that fits the cohort parameters. If the user provider has 3 parameters, they look for the consumer users that are in all 3 cohorts.

In some embodiments, verifying information may be performed by third parties, government agencies, employers, banks, credit card companies, and/or verification service providers. The data values may include metadata which may further include a date of input, a data source, and a verification method used.

In some embodiments, the profile of the specified user may include age, gender, place of residence, spouse, occupation, employer, liabilities, credit score, income, current credit or loan obligations, and/or current mortgage obligations.

The benefits to users and third parties using the computer-implemented method for self-aggregation of personal data and for self-aggregation of personal data of a user and personal data custody, control, and stewardship as disclosed herein may include the following features:

1. A computer-implemented method for assisting a user [consumer] in identifying and aggregating their personal identifiable information.
2. A computer-implemented method for a user to generate their own comprehensive personal identifiable information that may include various types of data including raw, anonymized and synthetic.
3. A computer-implemented method for securely storing data in different environments based on data properties as defined by the users profile including mutable and immutable data and storage objects.
4. A computer-implemented method to personalize attributes of the user interface and experience, such as general ergonomics and education, and personal identifiable information to determine factors, including device type, media type to use, subject matter, presenter, user interface (UI), user interface and experience (UIX), frequency, time and day reminders, assignment, tests and scoring.
5. A computer-implemented method for allowing the users to generate their own computer-implemented method for managing personal identifiable information e.g., raw, anonymized, and/or synthetic personal identifiable information.
6. A computer-implemented method for assisting a user [consumer] in analyzing or understanding their personal identifiable information.
7. A computer-implemented method of educating a user about what their personal identifiable information implies about their financial profile, strengths, and/or weaknesses.
8. A computer-implemented method for managing personal identifiable information.

In the embodiments disclosed herein, users may control their own data. In addition, lenders may have cost effective, on-demand access to the user's PII, and may opt-in to complete user data with validation. This may streamline and expedite the loan process, for example. Instead of a loan applicant repeating the same process with the same forms and documents, access may be granted to a perspective new lender for access to that exact information. Thus, the entire loan process may be substantially shortened and simplified.

In some embodiments, the consumer may grant the lender permissioned access at different levels for prequalification, then greater access at the next stage for application. Regarding the consumer permissions (opt-in), the YP platform may allow the lender to have easy access to the consumer data either via synthetic or anonymized profile matching, the consumer's specific permissioned access (opt in), and/or via a prepared preprocessed set of data. This may be a subset of the PIIMAP and/or PII PRINT for prequalification or a full set for loan application values, documents and verification data.

Furthermore, any data sharing between the YP platform and third-party computer systems may be based on an opt in profile filtered and refined by a series of paired questions or any other suitable procedure. In some embodiments, certain synthetic data may be analyzed and relayed to third parties, and subject to permissioning, but the PII data is may be granted permissioned access based on a per diem basis, that the consumer may renew.

The YP platform may provide a central repository for a user's financial information and documents, which may be accessed by any number of authorized lenders or financial institutions. Any data sharing may be based on the user's choice to share a specific set of information with a specific person or enterprise. In other embodiments, the consumer permissioned data, once granted permissioned, the 3rd party computer system may choose to receive all or a part of the permission data have been permissioned (e.g., any subset thereof).

Thus, having applied the computer-implemented method for self-aggregation of personal data and for self-aggregation of personal data of a user and personal data custody, control, and stewardship once to fill out a first loan application, any subsequent loan applications may be automatically filled out by the YP platform. The system may enable a consumer to use a single, validated loan application and input data directly into a lender's loan origination system. The system may enable banks to prequalify loan applicants with better quality data and less regulatory liability.

Stated differently, once the user's PII MAP has been sufficiently populated with PII data, the PII MAP on the YP platform for self-aggregation of personal data of a user and personal data custody, control, and stewardship for choosing what personal data to selectively relay to third parties. The YP platform may provide a central safe trusted place to store all of the user's personal financial records. The YP platform may be a source of personally tailored information, thereby assisting the user in increasing their financial literacy about loans, credit cards, banking, mortgages, taxes, budgeting and other financial matters.

In some embodiments, the secure electronic location may calculate financial ratios from the extracted data. These ratios may be formatted accordingly to data standards commonly used by financial institutions, for example, The Mortgage Industry Standards Maintenance Organization (MISMO), which is responsible for developing standards for exchanging information and conducting business in the U.S. mortgage finance industry, created the Industry Loan Application Dataset (iLAD). These ratios may be calculated on the Raw data or Anonymized data in the PII MAP. The output may be a sum expressed as a ratio along with metadata (e,g, verification method, documentation type etc.) and, if required, certain assumed variables (e.g. Property value, new loan amount) in a format according to various industry data standards (e.g. iLAD). This PII Print creates a synthetic data set for a specific consumer that allows, in one instance, a mortgage lender to analyze verified document primary mortgage qualification ratios, without the lender needing to come in direct contact with the consumer's PII data. PII Print may use multiple assumptions and express various ratios for example:

In some embodiments, the YP platform may perform a PII Print of a common underwriting ratios output. The common underwriting ratios may be, for example, when a loan amount has been specified by the borrower with an assumed interest rate and key ratios. Each key ratio may have a multiple segment coded variation chain such as for example [Type 1/Date] [Type 2/Date]=[collaborated/rate as a %].

In some embodiments, the YP platform may perform a PII Print of a common underwriting ratios output. The common underwriting ratios may be, for example, when a loan amount may be the current outstanding mortgage balance and the interest rate is assumed and key ratios. Each Key ratio may multiple segment coded variation chain such as for example, [Type 1/Date] [Type 2/Date]=[collaborated/rate as a %].

In some embodiments, the YP platform may perform a PII Print of a common underwriting ratios output. The common underwriting ratios may be, for example, when a loan amount and interest rate are assumed. Each Key ratio has multiple segment coded variation chain e.g. [Type 1/Date] [Type 2/Date]=[collaborated/rate as a %].

In some embodiments, the YP platform may perform a PII Print of a common underwriting ratios output. The common underwriting ratios may be, for example, when key ratio ranges are assumed [lender specific] and other ratios may be multiple segment coded validation chain e.g. [Type 1/Date] [Type 2/Date]=[collaborated/rate as a %].

In some embodiments, a database used for the secure locations and the PII MAP may include a federated database system, which may further include distributed, multi-model, and deductive databases with direct data inputs, as well as images and/or PDF files either inputted directly by the consumer, derived from documentation provided by consumer (e.g., data and/or metadata), received from third party verification services authorized by the user, generated by the user's use of the application, or any combination thereof. In other embodiments, an AI engine (e.g., the AI/algorithm/ rules module 43 as below) may validate the data by cross-collaboration of multiple data points within YourPII system as a means of verification. In yet other embodiments, YourPII with permissioned access by the consumer, may permit third-parties (such as PLAID or FISERV, for example) to verify data points of a consumer, who is a user of the YourPII system.

In some embodiments, the system may utilize URLA, ULAD and MISMO standard datasets with OCR and artificial intelligence (AI) to extract data from loan applications, bank and credit card statements, tax returns, W-2 and 1099 forms, pay stubs, or other financial-related documents. These data sources may be validated against third parties with each process date stamped, and stored in a blockchain dataset(s), which may be further layered based on times enhancements. This layering may include consumer educational activities, preferences questions, and level of understanding Although the embodiments disclosed herein for self-aggregation of personal data and for self-aggregation of personal data of a user and personal data custody, control, and stewardship may be applied to exemplary use cases in the financial industry sector, this is not by way of limitation of the embodiments of the present disclosure. The embodiments may be equally applied to use cases in managing user PII data in medical records, gaming, digital advertising, in legal services, and/or in other industry verticals leveraging the use of a user's PII. Accordingly, the embodiments herein below refer to a more generic usage case in the management of a user's PII which may be applied to any industry vertical using a user's PII.

In some embodiments, a Provider User may be providers of Good and/or services that may be in the system. In the Financial Services industry use case (e.g., Credit Card company or mortgage company), the system may receive anonymized data in varying amounts. First, a minimal amount for pre-screening, and then larger anonymized data for prequalification. The full application data may include data points for a loan application 1003 FNMA, collaborative documentation (e.g. 1040 tax return, bank statements etc.), Data/Document verification information, other metadata (e.g., demographic, psychographic, behavioral and/or quantitative user-specific parameters).

In some embodiments, for an advertising industry use case (e.g. Taboola, Amazon.com retail Website, Spotify, and ITunes), the system may receive anonymized data in varying amounts: (i) a minimal amount of data may be for High Level Demographics and (ii) a larger set of anonymized Demographic and Psychographic data. The system may receive their actual PII in various levels: (i) a minimal set of data may be for High Level Demographics, (ii) a next level set of data including Demographic and Psychographic data, and (iii) a larger set of demographic, psychographic, and behavioral data (e.g., purchase history etc.).

In some embodiments, the service providers in various industries dealing with consumer data may be recipients of the data that the consumer has permissioned in addition to their role as data contributors, e.g. Experian. These service providers may receive self-reporting Data such as PLAID. They may originate or validate data and can sell third-party validation for a particular consumer file as well.

FIG. 1 depicts a system 1 for self-aggregation of personal data of a user and personal data custody, control, and stewardship in accordance with one or more embodiments of the present disclosure. The system 1 may include a server 15, a computing device 65 of a user 10, M third party servers 20A, 20B, and 20C where M is an integer, and Q electronic resources 25A, 25B, 25C where Q is an integer all communicating 35 over a communication network 30.

In some embodiments, the computing device 65 of the user 10 is not limited to a desktop computer as shown in FIG. 1, but may include a laptop, a tablet, a smartphone, a cellular phone, Alexa, wearable devices, any suitable communication device, and the like.

In some embodiments, the computing device 65 of the user 10 may include a processor 66, a memory 75, input and output (I/O) devices 76 such as a keyboard 76B and a display 76A of the user 10 displaying a GUI 70, and a communication circuitry 77 for communicating 35 over the communication network 30. The processor 66 may be configured to execute software modules stored in the memory 75, such as the YOUR PII software platform and interface 80 a graphic user interface 70 displayed as GUI 70 on display 76A.

In some embodiments, the server 15 may include a logic layer processor 40, a memory and/or storage device 50, input and output (I/O) devices 60, and/or a communication circuitry 55 for communicating 35 over the communication network 30. The logic layer processor 40 is a processor that executes a logic layer software application.

In some embodiments, the logic layer processor 40 may be resident in any suitable computing device and is not limited to the server 15 as shown in FIG. 1.

In some embodiments, YP platform may use any distributed storage system and is not limited to storage on the server 15.

In some embodiments, the logic layer processor 40 of the server 15 may execute software modules stored in the memory 50 to perform the functions of the system 1 described herein. The software modules may include a self-aggregation data module 41 for collecting and aggregating PII data from the user 10 from the plurality of electronic resources 20A, 20B, and 20C denoted ER1, ER2, . . . ERQ, a PII classifier module 42 for classifying the PII data of the user 10 into types and/or classes of PII data, an artificial intelligence (AI), algorithm, and/or set of rules module 43 for transforming the PII data of the user, a data structure manager module 44 for building, updating and maintaining a data structure 6 and/or a PII MAP 5 of the user 10 based on the PII data of the user 10, a plurality of data management software functions 45 for using the PII data and the PII MAP 5 of the user 10 to perform many of the data management software functions described herein, a graphical user interface (GUI) manager 47 for controlling the GUI 70 and/or the YP platform 80 running on the computing device 65 of the user 10, and/or an application programming interface (API) manager 48.

In some embodiments, the data structure 6 may be a distributed set of federated data. In other embodiments, the PII MAP 5 may be a matrix with two and/or three vectors.

In some embodiments, the memory 50 of the server 15 may store data for each of the plurality of N users, where N is an integer. For example, the memory 50 may store for USER1 51 in secure electronic locations1 52 for USER1 and a PII MAP1 53, and for USERN 54 in secure electronic locationsN 57 for USERN and a PII MAPN 56.

Initial or Raw PII (e.g., received from the electronic resources 25A, 25B, and 25C) for the user 10 and/or transformed PII after applying the artificial intelligence (AI), algorithm, and/or set of rules module 43 (known herein after as the AI/algorithm/rules module 43) may be stored in either the at least one secure location 57 for USERN and/or PIIMAPN for the Nth User. The PIIMAP (e.g., PIIMAP1 . . . PIIMAPN) may be stored like objects and/or erasure coding (e.g., distributed storage).

It should be noted that although these secure electronic locations 57 and/or PIIMAPN 56 may reside on the server 15, they may be located in any suitable storage location that may be at any remote location and/or may be in distributed storage and/or may be located on different computing systems that may accessible by the various software modules by the logic layer processor 40 and/or element on the server 15 so as to perform the functions described herein.

In some embodiments, M third party servers 20A, 20B, and 20C denoted TPS1, TPS2, . . . TPSM where M is an integer associated with an entity and/or a person that may wish to receive PII of the user 10 with permissioned access. In other embodiments, permissioned access may be a one-time access to a limited amount or may be a complete set of data values (e.g. ASCII formatted in a particular schema like ILDA), media (PDFs as in a 1040 tax form) as well as verification data and other metadata.

In some embodiments, the third-party entity and/or person may need to do so through API if required denoted API1, API2 . . . . APIN which may be managed and/or recognized by API manager 48 on the server 15.

In some embodiments, the plurality of electronic resources 25A, 25B, and 25C may each a plurality of data elements. For example, ER1 may include data element1 26A . . . data element1 27A where I is an integer, ER2 may include data element1 26B . . . data elementJ 27B, where J is an integer, and ERN may include data element1 26C . . . data elementK 27C where K is an integer.

An electronic resource in the context used herein may refer to, but not limited to a resource which require computer access or any electronic product that delivers a collection of data, be it text referring to full text bases, electronic journals, image collections, other multimedia products and numerical, graphical or time based, such as, for example, as a commercially available title that has been published with an aim to being marketed. An electronic resource in the context described herein may further refer to a resource in which a user's PII may be stored in a plurality of data elements. An electronic resource may include data transfer project (DTP) data such as Facebook, Google, LinkedIn, etc.

In some embodiments, the plurality of data elements may include, but is not limited to a US State Driver's license, a State ID, a US Passport, a foreign Passport, a foreign Driver's license, a Birth Certificate, a Voter Registration, a Hunting License, a Special Vehicle license, a Motor Vehicle Registration, Experience Data Model (XDM) System Data, a Cross-device, a cross-platform customer journey tracking, a Purchase history, a browsing, a shopping cart, a calendar schedule of meetings and events, a History of game play (including scores, awards, prizes, and/or levels achieved), a History of usage application, a browser history, a data Export in Data Transfer Protocol format, a play history from a streaming media website, a Google Take Data Export, an IP address, a Browser type, Browser language settings, Screen size, Custom segments, Device type, Plugin details, an Internal Revenue Service (IRS) Form 1040, an IRS Form 1120, an IRS Form 1065, an IRS Form W2, an IRS Form 1099, Data, an IRS Transcript, a financial document, a bank statement, a credit card (e.g., purchase history), digital forms of canceled checks, a statement, an appraisal document, a home inspection document, a signed contract, a disclosure form, a pay stub, a Utility Bill, a consumer credit report, a consumer credit score, a data export from a repository of consumer credit data using the Metro2 data schema, a Telecom bill, a financial-related document, a Transaction history, an X-ray, CGI, Medical Test results (Blood test results, Covid-19 test results), or any combination thereof and metadata of these files (e.g., data elements).

In some embodiments, the PII classifier 42 and/or the AI/algorithm/rules module 43 may classified the data in accordance with a standardized predefined data schema and generating metadata that will be part of the PIIMAP. The metadata may enable a universal translation to any standardized predefined data schema. The standardized predefined data schema as used herein may refer to, but is not limited to data for import/export via an API with specific formats (PDF, ASCII etc.) set by ISO 13606:2019 XML Schema, Schema.org, Experience Data Model (XDM), MeF, FDX, OFX, DTP, Takeout, AIM, URLA, ULDA, ILDA, and times series data, Guideline Definition Language v2 (GDL2 SPECCDS-2, GEHR (The GEHR Object Model), ISO 19115, and/or DDI.

In some embodiments, for data exporting, the data may be taken and automatically formatted to the standardized predefined data schema need for a particular application that is being exported to.

Figure 2:
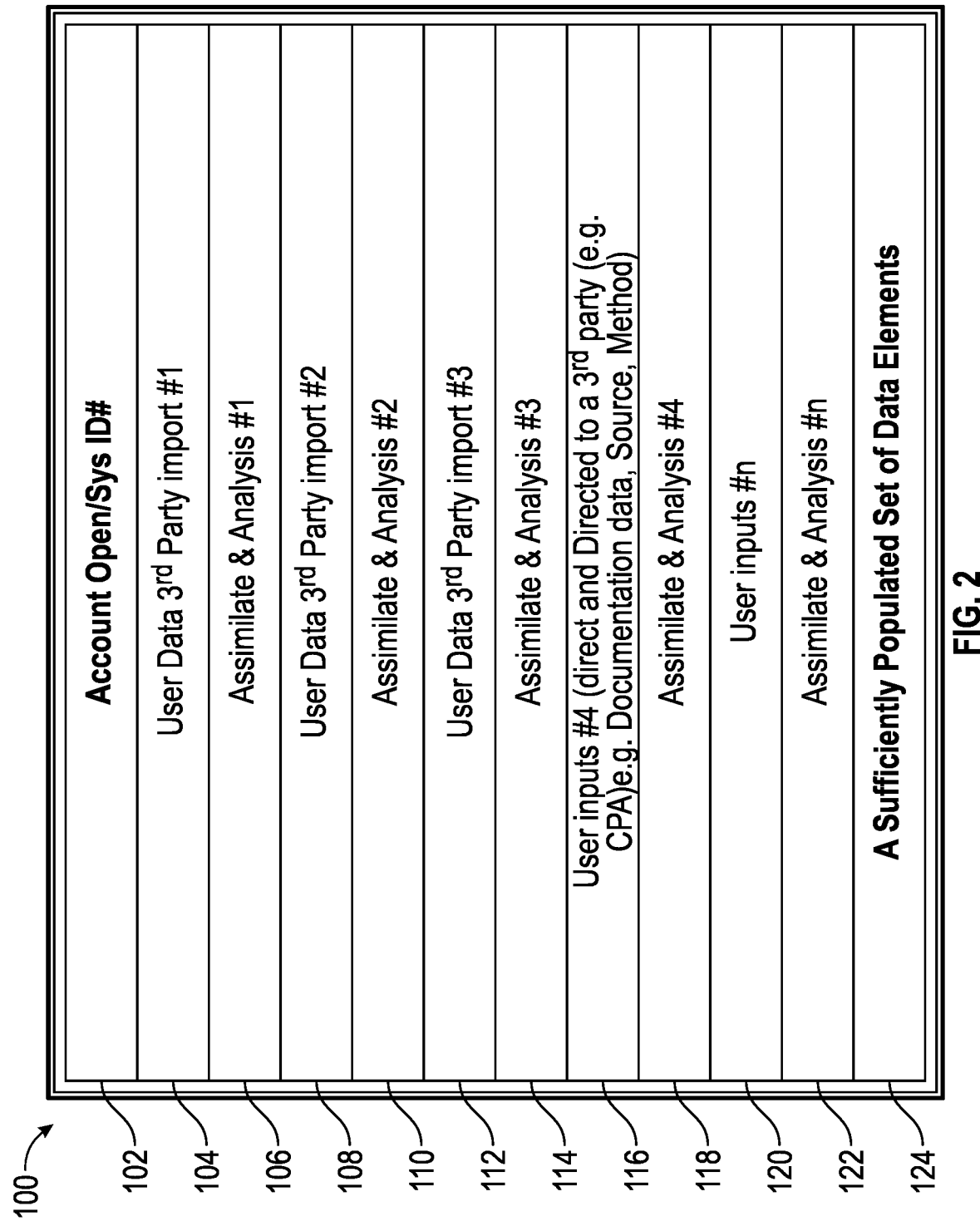
FIG. 2 depicts a process flow for the self-aggregation of a user personal identifiable information of a user in accordance with one or more embodiments of the present disclosure.

FIG. 2 depicts a process flow 100 for the self-aggregation of a user personal identifiable information of a user in accordance with one or more embodiments of the present disclosure. The steps herein below as described in FIG. 2 may be performed by the logic layer processor 40, and more specifically by the logic layer processor 40 executing the self-aggregation data module 41, the PII classifier module 42, the AI/algorithm/Rules module 43, and/or the data structure manager 44 of FIG. 1. In other embodiments, the PII classifier 42 and the AI/algorithm/Rules 43 modules may be the same module.

In some embodiments, an account of the user 10 on the YP platform may be opened and/or a system identification ID number may be generated in a step 102. This may occur in multiple ways such as for example: (i) in short iterative responses such as name and then email, (ii) simultaneous or sequential login through Linkedin, Facebook, Gmail accounts, any social media accounts, and/or any email account, (iii) uploading a picture ID via a mobile Operational Capability Improvement Request (OCIR) with ID verification. Any mobile device and.or any computing device may use the verification services, which may be a cloud-based service from a third party. Step 102 may include a default automatic or opt-in user preferences for storage prompts. In other embodiments, two-step verification and/or two-factor authentication may be implemented. The user may designate where to store the data. The YP platform may be accessed via a web browser running on the computing device 65 of the user 10 and/or by a client-side application (e.g., YP platform 80) running on the computing device 65 of the user 10.

In some embodiments, after the account of the user 10 is opened, the self-aggregation module 41 may prompt the user 10 on GUI 70 to import their credit reports from suppliers of credit reporting data in a first user, third party data import step 104, such as the main U.S.-based three credit bureaus, e.g., Experian, Transunion, and Equifax. The PII data elements with this information may be imported directly from any of the plurality of electronic resources 25A, 25B and 25C associated with the credit bureau repositories. The PII data elements may be imported from any of the plurality of electronic resources 25A, 25B and 25C associated with at least one vendor that provides data from any of the plurality of electronic resources 25A, 25B and 25C associated with the credit bureau repositories. The PII data elements may be imported from a website supplying the credit information such as annualcreditreport.com, for example. This data may also include the verification sources of the PII data elements received any of the plurality of electronic resources.

In some embodiments, the AI/algorithm/rules module 43 may analyze in a step 106, the data aggregated from the first user third party data import step 104. A user-specific profile map, (e.g., PII MAP 5) that may include a data structure based on the PII data elements using the initial data from step 104 (e.g., data structure with initial raw data). In addition, the AI/algorithm/rules module 43 may further identify gaps in the received data, identify what other data may need to be imported, and/or to ask the user 10 on GUI 70 if the user 10 may have additional accounts with other third-party entities, for example. In other embodiments, a personal profile crawler over the plurality of electronic resources 25A, 25B, and 25C may be used to identify the gaps in the received data.

In some embodiments, the self-aggregation module 41 may prompt the user 10 on GUI 70 in a second user third party data import step 108, for example, to extract PII data from websites of social media and/or email websites such as, for example, Linkedin, Facebook, Google, Apple, and/or Twitter. In other embodiments, the open source initiative known as data transfer project (DTP) may be used in acquiring this data.

In some embodiments, the AI/algorithm/rules module 43 may analyze the data from the social media and/or email websites in a step 110, for example, to apply modeling and/or statistical analyses extracting demographic, lifestyle, psychographic and/or behavioral user-specific data (e.g., parameters) from the user 10 and the data structure manager 44 may further update the data structure of the PII MAP 5 with PII data transformed by the AI/algorithm/rules module 43. The AI/algorithm/rules module 43 may further identify gaps in the received data from step 108 and identify what other data may need to be imported, and/or to ask the user 10 on GUI 70 if the user 10 may have additional accounts with other third-party entities (additional social media and/or email accounts), for example.

In some embodiments, the self-aggregation module 41 may receive quantitative data (e.g., parameters) by prompting the user 10 on GUI 70 in a third user third party data import step 112, for example, to log into multiple financial accounts, such as bank account, loan accounts, and/or credit card accounts to extract PII data. In other embodiments, an application such as Akoya, for example, may be used to download financial statements and spreadsheets with account activity data in CSV format, for example.

In some embodiments, demographic user-specific parameters may include gender, DOB (age group), marital status, education, occupation, and/or family structure, etc of the user 10.

In some embodiments, psychographic user-specific parameter may include Category Recency/Frequency/Monetary Value (RFM), lifestyles, opinions, attitudes, and beliefs, personality traits, psychological responses, social trends, AM/PM Personality Profile, Myers-Briggs Type Indicator (MBTI), Minnesota Multiphasic Personality Inventory (MMPI), DiSC personality profile, The 16 Personality Factor Questionnaire (16PF), and/or HEXACO Model of Personality Structure Personality Inventory of the user 10.

In some embodiments, behavioral user-specific parameters may include activity, interest, opinion (AIOs), attitudes, values, and/or behavior of the user 10.

In some embodiments, quantitative user-specific parameters may include specific values relating to usage history, product ownership, medical history, financial history, etc. of the user 10.

In some embodiments, the AI/algorithm/rules module 43 may analyze the quantitative data (e.g., the financial data) in a step 114. Liabilities of the user 10 may be extracted from the credit reports and/or the quantitative data. The AI/algorithm/rules module 43 may further identify gaps in the received data from step 112 and identify what other data may need to be imported, and/or to ask the user 10 on GUI 70 if the user 10 may have additional financial accounts with other third-party entities, for example. The data structure manager 44 may then update the PII MAP 5.

In some embodiments, the self-aggregation module 41 may receive quantitative data by prompting the user 10 on GUI 70 in a fourth user third party data import step 116. A prompt on GUI 70 may direct the user 10 to receive more PII data elements from another third party such as a certified public accountant (CPA), for example. In other embodiments, the user 10 may designate through the GUI 70 for the self-aggregation module 41 additional data sources and documentation from which to receive PII data elements. These additional data sources and documentation may be deemed important by the YP system, independent of the user 10 for building the PII MAP 5 of the user 10. For example, the user 10 may have previously saved financial statements, for example, or other documents to upload for the PII MAP 5.

In some embodiments, the AI/algorithm/rules module 43 may analyze the data in the additional documents (e.g., from the step 116) for updating the PII data structure of the PII MAP 5 in a step 118. The AI/algorithm/rules module 43 may further identify gaps in the received data from step 112 and identify what other data may need to be imported, and/or to ask the user 10 on GUI 70 if the user 10 may have additional financial accounts with other third-party entities, for example.

In some embodiments, this iterative flow shown in FIG. 2 may continue n times where n is an integer to self-aggregate and analyze the PII data of the user 10. The self-aggregation module 41 may receive PII data by automatically, by prompting the user 10 on GUI 70 in an n-th user third party data import step 120, and/or by the user 10 designating data sources and documentation to use in the PII data structure in a step 120. This data from n-th user third party data import (e.g., the step 120) may be applied to the AI/algorithm/rules module 43 to transform the PII data of the user which the data structure manager 44 uses to update the PII data structure of the PII MAP 5 in a step 122.

In some embodiments, this iterative flow may continue until a PII data structure with sufficient granularity may include a sufficiently populated set of data in step 124. The data structure manager 44 may determine when the user-specific profile map crosses any suitable predefined data threshold in terms of a threshold amount of PII in the PIIMAP 5. In this case, the user-specific profile map may be referred to as a user-specific threshold profile map. The threshold may vary based on the user's profile. Some factors may include but are not limited to demographic factors, psychographic factors, behavioral factors, and current best practices in UI design psychology including (i) decision fatigue, (ii) the Fogg B-Map, (iii) gamification, (iv) behavioral design and (v) other cognitive psychology factors that come in effect with the field of interface design.

In some embodiments, the AI/algorithm/rules module 43 may determine the balance between starting to populate the PIIMAP 5 with as much data as possible, the user effort required, the user levels of motivation and the probability of sustaining that motivation.

Figure 3B:
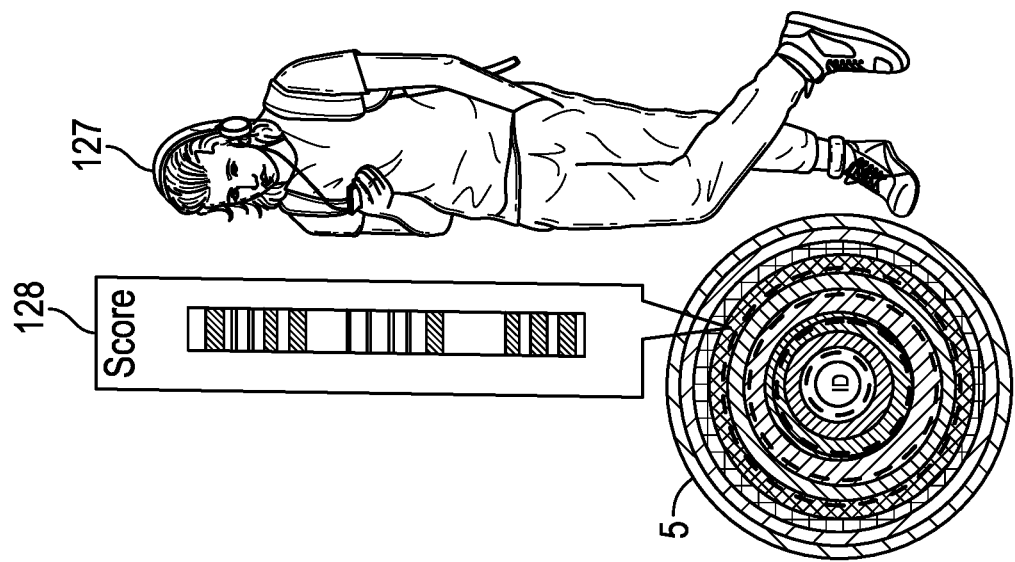
FIGS. 3A and 3B depict a first threshold PII MAP and a second threshold PII MAP in accordance with one or more embodiments of the present disclosure.
Figure 3A:
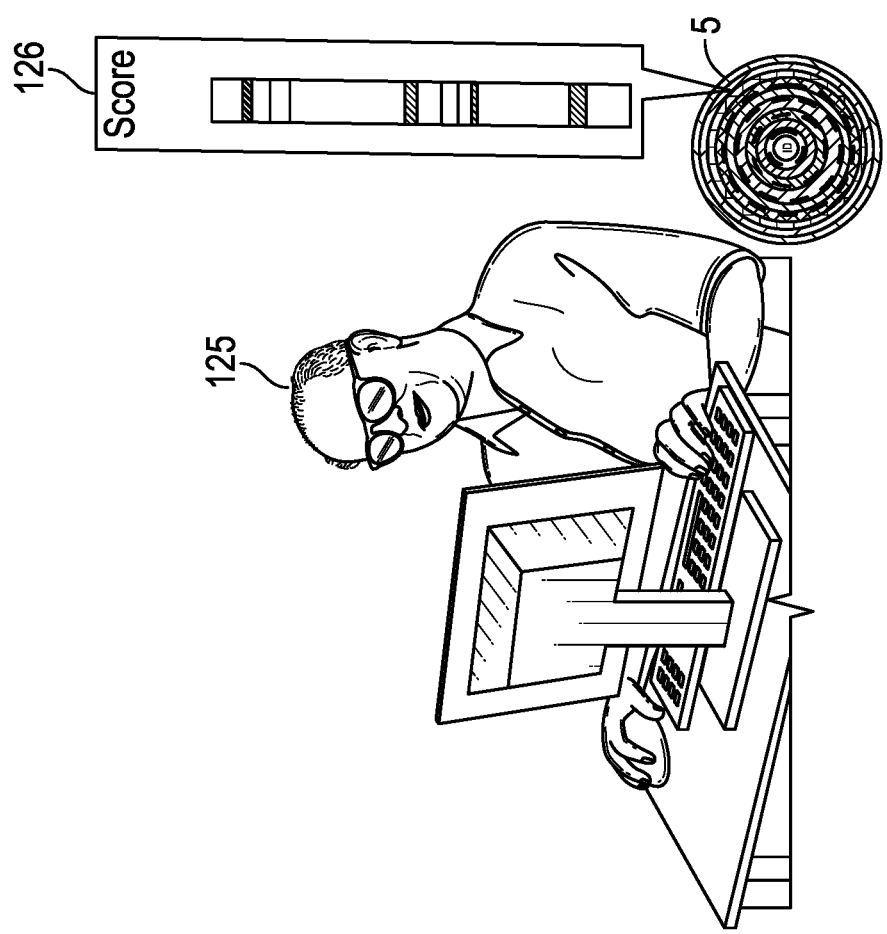

FIGS. 3A and 3B depict a first threshold PII MAP 126 and a second threshold PII MAP 128 in accordance with one or more embodiments of the present disclosure. The first threshold PII map for a user 10 referred to as user1 125 that may be a senior citizen for example. User1 125 may have a lower score or a lower threshold such that data may need to be added to the PIIMAP 5 in later iterations. The second threshold PII map 128 for a user 10 referred to as user2 127 that may be a young man, for example. User2 127 may have a higher score or a higher threshold such that the user2 may be able to tolerate the time and effort to collect more data in the initial setup.

Figure 4:
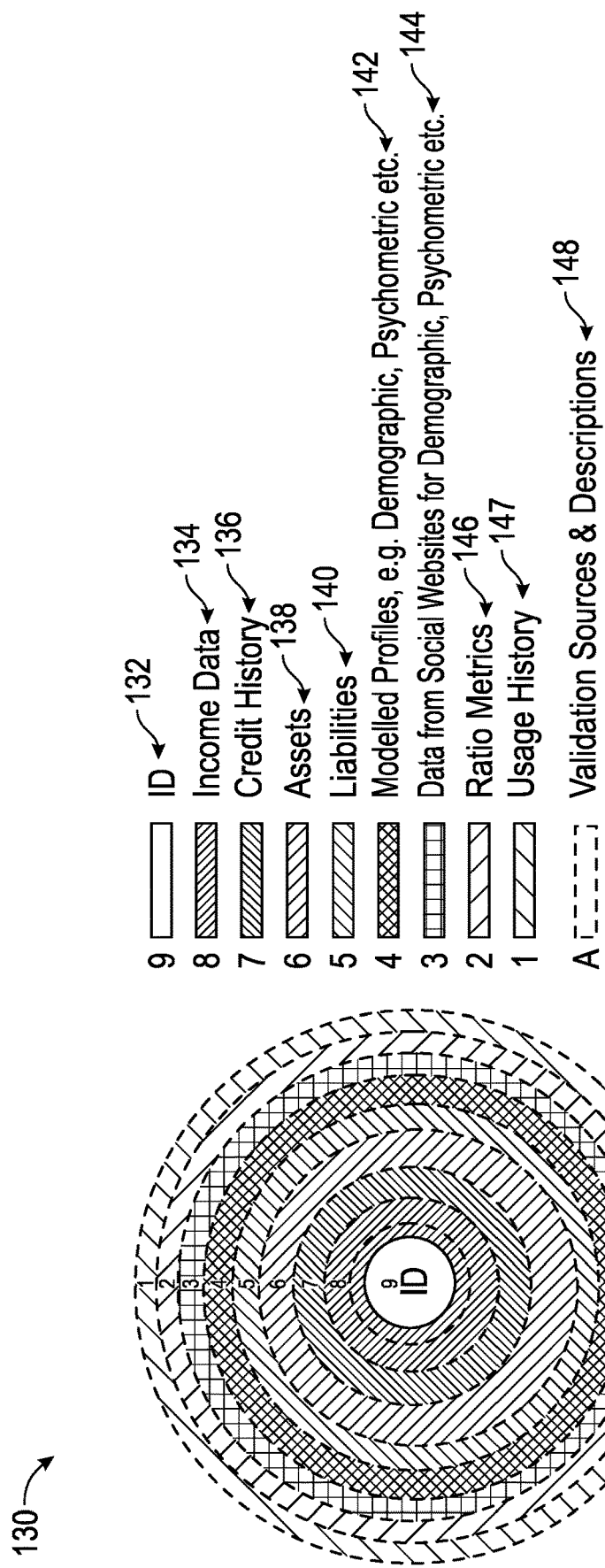
FIG. 4 depicts a graphical representation of data types used in the personal identifiable information map of a user in accordance with one or more embodiments of the present disclosure.

FIG. 4 depicts a graphical representation 130 of data types used in the personal identifiable information map (e.g., the PII MAP 5) of the user 10 in accordance with one or more embodiments of the present disclosure. The data types used in the PII MAP 5 of the PII of the user 10 as shown in the graphical representation 130 may include an identification (ID) 132, income data 134, a credit history 136, assets 138, liabilities 140, modeled profiles 142 (such as demographic, psychometric, etc), data from social websites 144 (e.g., demographic, psychometric, etc.), ratio metrics 146, and usage history 147. The PII MAP 5 data types may also include validation sources and descriptions 148 for the data with the user's PII as shown in the dashed lines. Security decoy data 150 dispersed throughout the PIIMAP (not shown in FIG. 4) may be an outer band 0 in the graphical representation 130 that may represent a computer security mechanism set to detect, deflect, or counteract attempts at unauthorized use of the systems shown herein. Approaching the center of the graphical representation 130, access to the data becomes more restrictive.

In some embodiments, data from the aggregation steps of the logic layer processor 40 receiving PII from credit reporting websites (e.g., step 104) and PII from social media websites (e.g., step 108) as previously described above may be analyzed by the PII classifier module 42. In other embodiments, the PII classifier module 42 may include a classifier machine learning model. In yet other embodiments, the functionality of the PII classifier module 42 to classify the user's PII into data types may be bundled into and performed by the AI/algorithm/rules module 43.

In some embodiments, the AI/algorithm/rules module 43 may analyze the aggregated data. A data structure (e.g., an initial build of the user profile) may be generated with raw data with PII of the user 10. The sections of data structure may be based on specified predetermined data schema which may include multiple score values whether if populated or not, and reliability of the analysis of data from steps 104 and 108 so as to build a user profile of age, gender, place of residence, occupation, employer, liabilities, credit score, and/or income current mortgage, for example.

In some embodiments, the AI/algorithm/rules module 43 may generate a list of user accounts (e.g. gaps in the profile data that may be rated by probability) that may have not been identified. The list may be an actual list or a proposed list that is based on probabilities and assessments from the AI/algorithm/rules module 43 after analyzing other factors.

In some embodiments, the AI/algorithm/rules module 43 may perform an analysis based on current User Profile AI that assesses the highest probabilities for the type of User Interface and User Experience (UIX) build, essentially a behavioral design of an optimal UIX, that will enable the user to get the most out of the YP platform with the least effort on the user's part. Optional configurations may be outputted to the user 10 which may be displayed on the GUI 70 as choices that the user 10 may define choice best for the user. The UIX may be generated based on AI/algorithm/rules module 43 and the User input.

In some embodiments, another process flow of for populating the data structure and developing PII machine automated presentation is as follows: the AI/algorithm/rules module 43 may identify missing PII data points from the received PII data, which may be outputted to the user 10 on the GUI 70 using multiple choice or dropdown menus. This gap analysis may be performed by the AI/algorithm/rules module 43 to identify a number of options that optimize the intersection for graphing an optimal UIX for inputting missing data. The AI/algorithm/rules module 43 may provide balancing that is least disruptive to the user 10 while still maintaining data integrity and comprehensiveness. This may need an incremental process to achieve the data integrity and comprehensiveness while maintaining the optimal UIX.

Note that the term optimal UIX as used herein may refer to a UIX that utilizes factors in Ethical Behavioral Design science which utilizes individual consumer attributes as derived from various functions in the YP platform including demographic, psychographic, cognitive, behavioral, and quantitative factors so as to generate a user experience that is both optimized and personalized for the particular user.

With the users' authorization, multiple data sources may be identified through the YP platform 80 through a personal profile crawler that utilizes the AI/algorithm/rules module 43 in the PII Print application to identify financial account data sources [e.g. a bank credit card on the credit report, or the 1099 interest reported.

In some embodiments, the user 10 may be presented with the identified missing data points based on a priority set generated by the AI/algorithm/rules module 43 based on the data structure analysis. The user 10 may be given a few options to choose from for adding or enhancing existing data. In other embodiments, the user 10 may choose an option "Identified For User" to allow the AI/algorithm/rules module 43 to make a final choice for the user 10.

In some embodiments, the user interface (UI) such as the GUI 70 for data input may be generated. Data may be inputted from a user's own online account, the web, files, an upload, or from a third party.

In some embodiments, the user 10 may choose at any time to continue data aggregation at another time, where they left off, to send a reminder, and/or to create join reminder group.

In some embodiments, the user 10 may choose a data aggregation option for each data point. The user 10 may include the same option for some or all the options. For example, the user may aggregate the user's own data from each online account. (i) For example, the client may log in to the user's bank account using the same browser with the same login user name as the user's YP account (hereinafter YP). The YP Application may include options for downloading PDF statements, screen scrape account information from browser, and download data. (ii) The AI/algorithm/rules module 43 may analyze and classify the data. For example, the logic layer processor 40 may encrypt the data if identified as highly descriptive sensitive financial data such as a bank statement based on classifications from the AI/algorithm/rules module 43. In other embodiments, the classification may also include a determination of the storage type and security to be used. If the bank statement is in a PDF format, the bank statement may be stored as immutable encrypted distributed storage. A W2 or 1099 form from a prior year may be stored in immutable encrypted distributed storage.

In some embodiments, the user 10 may choose to aggregate the user's own data from local files stored on the user's computing device 65 and/or the user may set reminders to remind the user 10 to self-aggregate data from another device (e.g. on the user's mobile device which may be set a reminder to retrieve a PDF file with their 1040 from the laptop or tablet). The UI (e.g., the GUI 70) may guide the user 10 to classify files. The GUI 70 may allow the user 10 to choose a form such as a 1040 tax return, to choose a year from a dropdown menu depending on UIX build above. The AI/algorithm/rules module 43 may extract data elements from the document with PII and may confirm with the user 10.

In some embodiments, the user 10 may authorize or enable a third-party source to upload data, such as the accountant (CPA) of the user 10. Enabling and/or disabling may be done with any third parties designated by the user 10.

In some embodiments, the AI/algorithm/rules module 43 may generate the data structure for the PII MAP 5 and multiple data set types (i.e. RAW, Anonymized, Synthetic). The AI/algorithm/rules module 43 may be applied to the data structure to analyze data based on Demographic, Behavioral, psychometric, psychographic user-specific parameters, which then populates those data points in the PIIMAP 5.

In some embodiments, the AI/algorithm/rules module 43 may analyze data based on various industry data standards, schemas, and/or syntaxes. Data tags such as income, debt, payment obligations, liquid assets, non-liquid assets, direct liabilities, contingent liabilities, and other data relating directly or indirectly to financial factors may be applied to the data. Tags may be metadata, or a data value expressed in a particular manner. Tags may include one or more standards from industry, NGO (organizations or open source) and or Government agencies, including Uniform Loan Application Dataset (ULAD), Uniform Residential Loan Application (URLA), The Mortgage Industry Standards Maintenance Organization (MISMO), eXtensible Business Reporting Language (XBRL), Object Management Group® (OMG®) and the like.

In some embodiments, the AI/algorithm/rules module 43 may be used in steps 104 and 108 above so as to generate a higher resolution data structure such as a two and/or three vector matrix that may include self-contained subsets. Each point in these matrices (e.g., data structure element) may represent a unique value including:

a. An element value (e.g. date of birth DOB)
b. How the values of two elements are related and expressed mathematically. For example, it may be the sum of one element value divided by another or another factor such as annual debt payments divided by annual income, for example.
c. The data source and/or type of a particular elemental value (e.g. DOB retrieved from Driver's License (DL))
d. The date of the relevant data source and/or type of a particular elemental value (e.g., a valid DL or if an elemental data value is dynamic, e.g. a bank account balance that may change periodically with the month and day of the statement).
e. A binary factor—even if a data structure element or point (e.g. "d" above) may still be valid, such as an 8-month-old bank statement. The 8-month old bank statement may not be relevant by itself. However, a current statement with two previous statements may show a trend, whereas the 8-month old bank statement may not be valid on a standalone basis.
f. A score value rating indicative of the data source validating factor value (e.g. "d" above). The data source with a lower score may be assigned to a copy of a paycheck as a validation for the source of income. However, income data retrieved from the IRS website or another trusted third party may have a higher score value.
g. Demographic elemental values such as Gender and/or in "c" above
h. Demographic values relating to the current quality, age, or presence in the data structure elemental values (like "d" above) which is true for all elemental data types.
i. Psychographic elemental values based on social issues that the individual may have expressed interest, based on what was last retrieved from Social Media (step 108) and/or spending habits (step 112) based on analysis of credit card or bank account statements.
j. Psychographic values related to the current quality, age, or presence in the data structure elemental values (like "d" above)
k. Behavioral elemental values (based on user's usage history of the method, or retrieved from Social Media, data from analysis of credit card or bank account statements, responses to requests for direct user input (step 116), which may be binary, multiple choice or direct field input from the GUI 70.
l. Behavioral values relating to the current quality, age, or presence in the data structure elemental values (like "d" above).

Figure 5:
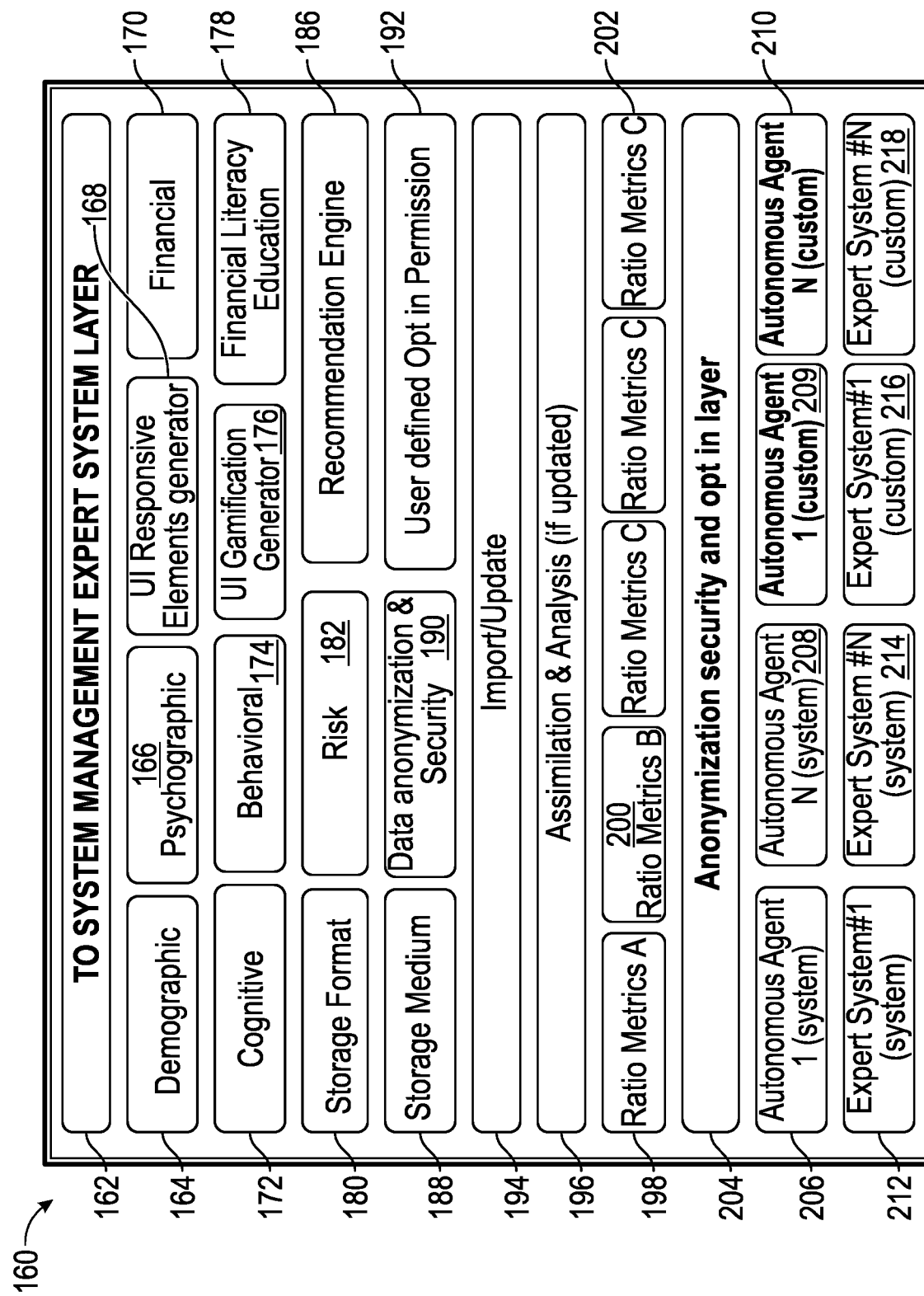
FIG. 5 depicts a plurality of data management software functions in accordance with one or more embodiments of the present disclosure.

FIG. 5 depicts an exemplary representation 160 of the plurality of data management software functions 45 in accordance with one or more embodiments of the present disclosure. The logic layer processor 40 is a processor that executes a logic layer software application. The logic layer software application may include, in part, the plurality of data management software functions 45. The logic layer processor 40 may process the incoming (initial) user PII, may generate the PII MAP, and may process an iterative PII MAP with additional received user PII with the PIIMAP including demographic parameters, psychographic parameters, behavioral user-specific parameters, and/or quantitative parameters. The logic layer processor 40 may manage interactions with the consumer user. The logic layer processor 40 may use the plurality of data management software functions 45 for a variety of functions described herein below.

In some embodiments, the plurality of data management software functions 45 may include:

(1) Function—System Management Expert System Layer 162
(2) Function for extracting Demographic information 164
(3) Function for extracting Psychographic information 166
(4) Function for generating UI responsive elements 168
(5) Function for extracting financial information 170
(6) Function for extracting cognitive information 172
(7) Function for extracting behavioral information 174
(8) Function for generating a gamification UI 176
(9) Function for providing financial literacy education 178
(10) Function for setting storage format 180
(11) Function for extracting risk information 182
(12) Function for generating user recommendations 186
(13) Function for setting storage medium 188
(14) Function for data anonymization and security 190
(15) Function for setting user-defined opt-in permission 192
(16) Functions for importing and update data 194
(17) Functions for assimilation and analysis 196 (if function 194 used)
(18) Functions for generating ratio metrics A 198
(19) Functions for generating ratio metrics B 200
(20) Functions for generating ratio metrics C 202
(21) Function for anonymization security and opt-in layer 204
(22) N functions for Autonomous Agent 1 (system) 206 to Autonomous Agent N (system) 208
(23) N functions for Autonomous Agent 1 (custom) 209 to Autonomous Agent N (custom) 210
(24) N functions for Expert System #1 (system) 212 to Expert System #N (system) 214
(25) N functions for Expert System #1 (custom) 216 to Expert System #1 (custom) 218

In some embodiments, with regard to the function for System Management Expert System Layer 162, each expert system may read and analyze based on the respective data types using the entire body of data of the PII MAP as well as inferred values based on the inter-relationship of the data. When the Expert system is able to extract a new value/data point, the PIIMAP may be updated.

In some embodiments, the logic layer processor 40 may execute functions when new data may be imported and or received that may include the function for extracting Demographic information 164, the function for extracting Psychographic information 166, the function for extracting financial information 170, the function for extracting cognitive information 172, and the function for extracting behavioral information 174. The function for extracting Demographic information 164 may identify data points with demographic value and may extract, for example, Home Address, Age, marital status etc. The function for extracting Psychographic information 166 may identify data points with psychographic value such as identifying data points and extracting, for example, luxury purchases, affiliations, etc. The function for extracting financial information 170 may identify and extract financial data, such as for example, asset values, liabilities, annual income, etc. The functions for extracting cognitive information 172 and behavioral information 174 may identify data points with Behavioral and cognitive value and may extract data such as for example, purchasing and viewing history etc.

In some embodiments, with regard to the function for providing financial literacy education 178, the logic layer processor 40 may use other function's (demographic, psychographic, cognitive, behavioral, quantitative) in conjunction with the UIX logic engine and gamification engine 176, that may include one or more expert systems 212 to 218. The function for providing financial literacy education 178 may apply these utilizing other YP system elements that may include taking into account the consumers' financial detail specifics and usage history so as to enable the user to learn more about subject matter pertinent to their personal financial condition and that are uniquely personalized and of interest to them. This will be used by the system as well as made available to third-parties (e.g., consumer permission-based).

In some embodiments, with regard to the function for setting storage format 180, the logic layer processor 40, based on identifying various characteristics of data and media/files imported, may set and specify the storage device to one or more storage types in one or more locations which may be used to store the content.

In some embodiments, with regard to the function for extracting risk information 182, the logic layer processor 40 may use the AI/algorithm/rules module 43 to identify various types of inter-relationships between data points in a generic way with a predefined standard unit of measure or value. The analysis of one or more data points in the PIIMAP may be against each other or external data points. The output of that analysis may be stored as an additional data point in the PIIMAP and/or or as an anonymous identifier or under the user's name (based on permissioning) within a cohort of similar analysis factors, types, or values.

In some embodiments, with regard to the function for generating user recommendations 186, the system may be able to confirm a user's interaction with a vendor. The user may be able to post a recommendation that may be available to individuals, groups, or general, per the user's choice. The user may have the choice of doing it anonymously or under their name. Moreover, the user may choose to make their recommendation anonymous for one group and to have their name appear in another. Depending on the subject matter, YP may only make the recommendation available to other consumers in the YP with similar mean attributes.

In some embodiments, with regard to the function for setting storage medium 188, the logic layer processor 40 may specify, based on identifying various characteristics of data and media/files imported, storage of one or more types and in one or more storage locations, which may be used to store the content.

In some embodiments, with regard to the function for data anonymization and security 190, the logic layer processor 40, based on identifying various characteristics of the raw data, metadata, files, or media imported, may determine the level and type of anonymization and access security.

In some embodiments, with regard to the function for setting user-defined opt-in permission 192, the logic layer processor 40 (e.g., YourPII), by using the factors (demographic, psychographic, cognitive, and behavioral) in conjunction with the UIX logic engine and gamification engine, may inform the user of their choices for opt-in/opt-out, and educate them about the ramifications of permissioning or not permissioning data in each specific situation. The user may be able to access these explanations at any time, as well as change their settings.

In some embodiments, with regard to the function for importing and update data 194, the logic layer processor 40 may control the automation of identifying data types as well as specific data locations for import. This may be done on an automated basis by YourPII in the background. It may be done through prompts to the user or as a reaction to an input by the user. Any time a user's input may be needed through (using the functionality of) the functions, the UIX logic engine and gamification engine may generate the user interface that may optimize and align the level of effort, motivation, ability, and prompts for the user.

In some embodiments, with regard to the function for analysis and assimilation 196 (if function 194 is used), the logic layer processor 40 may analyze data, files, and/or media, as well as existing raw data. The AI/algorithm/rules module 43 may to generate additional YourPII MAP data points including but not limited to demographic, psychographic, cognitive, behavioral, and quantitative data points. This process may happen upon data, file, and/or media import, as well as on an ongoing basis to all the data in all YP data types (raw data, PIIMAP, PII Print, etc.) in the YourPII system.

In some embodiments, with regard to the function for generating ratio metrics A 198, the logic layer processor 40 may generate ratio metrics based on a library of values and or other YP functions (including autonomous agents and Expert Systems) by using the functions including demographic, psychographic, cognitive, behavioral, and quantitative in conjunction with the UIX logic engine. A provider-user (e.g., a provider of goods or services to the consumer) may be provided a UI where they may define the key ratios that they use in pre-qualifying potential customers or in the case of government or NGOs, pre-qualifying potential recipients. This may generate a query that will identify all the [consumer] users (subject to consumer permissioning) on the YP system that match their requirements. The result of this query may be in the form of internal YP functions that prompt offers to the [consumer] user (subject to consumer permissioning) or that will generate a list of query matches (the quantity of which may be total or limited to a predefined amount). The list may be available only in the YP system and/or as an exportable list for the provider-user, subject to consumer permissioning, and the provider-user rights on the system. This may be a one-time action or may create an autonomous agent that may perform this on a recurring basis, which may be unique to the provider-user and may run on an automated or on-demand basis per the provider-user's choice. This description of the function for generating ratio metrics A 198 is identical to the function for generating ratio metrics B 200, and to the function for generating ratio metrics C 202.

In some embodiments, with regard to the function for anonymization security and opt-in layer 204, the logic layer processor 40 may manage levels and types of data anonymization, storage and access security in the system.

In some embodiments, with regard to the N functions for Autonomous Agent 1 (system) 206 to Autonomous Agent N (system) 208, these may be autonomous agents that may be called to function by other parts of the YP system. This autonomous agent may run analyses in the system utilizing any of the AI/algorithm/rules, functions (e.g., demographic, psychographic, cognitive, behavioral, and quantitative) and expert systems in YP, so as to analyze individual profiles, user cohorts, or total user population for other system functionality.

In some embodiments, with regard to the N functions for Autonomous Agent 1 (custom) 209 to Autonomous Agent N (custom) 210, these may be autonomous agents that can run analyses in the system based on inputs from a provider-user (e.g., provider of goods or services to the consumer) utilizing any of the AI/algorithm/rules, functions (e.g. demographic, psychographic, cognitive, behavioral, and quantitative) and expert systems in YP, so as to analyze individual profiles, user cohorts, or total user population for other system functionality.

In some embodiments, with regard to the N functions for Expert System #1 (system) 212 to Expert System #N (system) 214, the logic layer processor 40 may execute a program internal to the YP system that uses AI/algorithm/rules and may include a set of values or logic forms, for one or more subject matter areas, and may utilize other resources in YP, including other expert systems, and any of the plurality of data management software functions 45 described hereinabove. The internal program may be used by the YP system to monitor actions, events, or data, both internal and external, be used by other functions in the YP system for complex queries, or coordinate processes between YP system functions, prompt or configure other systems in YP, to identify certain user, system or third-party actions and conditions, to determine response to those or other events (including but not limited to time-related factors) and to determine or call a predetermined response.

In some embodiments, with regard to the N functions for Expert System #1 (custom) 216 to Expert System #1 (custom) 218, the logic layer processor 40 may execute a program that uses the AI/algorithm/rules module 43 and may include a set of values or logic forms, for one or more subject matter areas that are defined or provided by a 3rd party or external sources (including a provider-user [provider of goods or services to the consumer]), and utilize other resources in YP, including other expert systems, and any of the plurality of data management software functions 45 described hereinabove. The program may be used by the YP system to monitor actions, events, or data, both internal and external, be used by other functions in the YP system for complex queries, or coordinate processes between YP system functions, prompt or configure other systems in YP, to identify certain user, system or third-party actions and conditions, to determine response to those or other events (including but not limited to time-related factors) and to determine or call a predetermined response.

A number of process flows for defining certain functionalities are now described herein below using the plurality of data management software functions 45.

In some embodiments, the logic layer processor 40 may generate a primary UIX Build, which may be generated earlier in the process and iteratively post the initial build. A customized user interface and experience may be generated for the user 10 based on the input of certain data structure values. These factors may include:

(1) Demographic factors
(2) Psychographic factors
(3) Behavioral factors
(4) Current best practices in UI design including (i) Decision Fatigue and (ii) other cognitive psychology factors that comes in effect with the field of interface design In embodiments based on the results of generating the primary UIX build, the logic layer processor 40 may choose a library of UI themes, logics, and graphical elements. These UI themes, logics, and graphic elements may be part of a YP generated library or generated by third parties. This may include elements from well-known designers at a cost if the user chooses.

Figure 6:
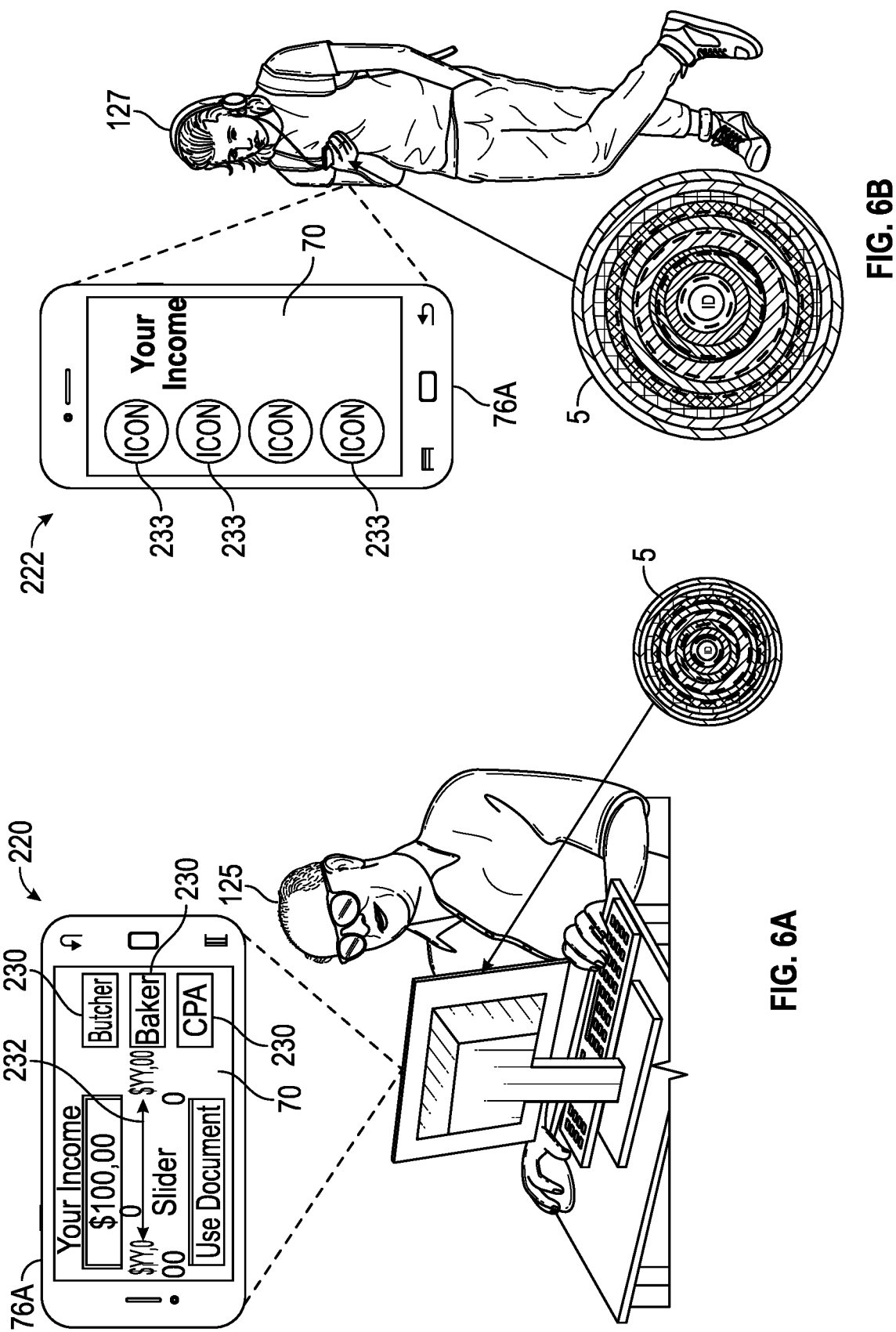
FIGS. 6A and 6B depict a first exemplary screenshot and a second exemplary screenshot of a graphic user interface in accordance with one or more embodiments of the present disclosure.

FIGS. 6A and 6B depict a first exemplary screenshot 220 and a second exemplary screenshot 222 of a graphic user interface in accordance with one or more embodiments of the present disclosure. These screenshots illustrate the function for generating UI responsive elements 168 for the user1 125 and for the user2 127 as described in FIGS. 3A and 3B. For example, generated UI elements may include an online form that will generate a next set of questions for the users based on the user responses to a previous set of questions, so as to enable an optimal UIX. The PIIMAP 5 may be used upon invoking function 168 to generate a user-specific profile interface tailored to the user1 125 and the user2 127. For example, the user1 may receive the GUI 70 that shows clickable icons 230 and/or slide bars 232 on the display 76A. Similarly, user2 127 may receive the GUI 70 that shows app icons 233 to press on a touchscreen of a smartphone, for example.

In some embodiments, GUI 70 may also display to the user 10, a optimal UIX on the GUI 70 which may allow the user to grant access rights to a portion of the PII data to an entity and/or person. The portion of the user's PII may refer to any extracted subset of the PIIMAP 5 that is granted access to be made readable or exportable by a person and/or entity that the user granted access rights/permissions. The user-specific profile interface on the GUI 70 may also allow the user to further adjust data and may signify the output data for a loan application, for example.

In some embodiments, the UI/UX elements may include but are not limited to Device Type, Device Model, Device configuration, OS, Screen size, Screen Resolution, Audio, Video, Eye tracking: Input Controls, Navigation Components, Informational components, Containers, Card, Breadcrumb, Bento Menu, Dropdown Checkbox, Kebab Menu, Input Field, Icon, Feed, Accordion, Button, Carousel, Comment, Doner Menu, Loader, Meatballs Menu, Modal, Notification, Pagination, Picker, Progress Bar, Radio Buttons, Search Field, Sidebar, Slider Controls, Stepper, Tag, Tab Bar, Tooltip, Toggle, icons, switches, click buttons etc. on the GUI 70 that allows the user to manipulate PII data that may be transformed by the AI/algorithm/rules module 43, for example.

In some embodiments, the user 10 may be provided with a series of binary choices to refine and check the user interface and experience definitions. The logic layer processor 40 may apply supervised or unsupervised machine learning here (e.g., in the AI/algorithm/rules module 43) by utilizing factors in behavioral design science, and by utilizing individual consumer attributes as derived from various functions in YP including demographic, psychographic, cognitive, behavioral, and quantitative factors to create an unique personalized optimization of the UIX.

In some embodiments, based on the user's choices, a UI configuration (e.g., the GUI 70) may be generated and presented as the UI of the User's YourPII application.

In some embodiments, the user 10 may accept, or recreate the UI configuration (e.g., go through the prior steps again now or at a later time). Reminders may be scheduled based on multiple factors including psychographics.

In some embodiments, the AI/algorithm/rules module 43 may use each set of results to help train the supervised or unsupervised machine learning models. The User 10 may be asked if user wants to become an active participant in a test group.

In some embodiments, the user interface and experience may allow the user to skip providing multiple-choice user input to create the UI. The logic layer processor 40 may iterate the UIX based on parameters determined in the data structure utilizing factors in behavioral design science, and utilizing individual consumer attributes as derived from various functions in YP including demographic, psychographic, cognitive, behavioral, and quantitative factors.

In some embodiments, the logic layer processor 40 may provide an ongoing update and/or enhancement of the PII MAP 5 and all elements generated from it. The logic layer processor 40 may identify what data may be missing from the PII Print. The logic layer processor 40 may continuously identify missing data and/or values within the user's data structures. These missing values may be prioritized by various value that may be dynamic including the intent of the user whether that has been stated or has been derived from the AI.

In some embodiments, the user 10 may be guided (depending on the UIX defined in the previous processes), which may include explaining what factors are missing, why the particular factors are important, and how to add them to the data structure. This may include inputting data through the personalized UI (via icons, dropdowns, field fill, and/or any suitable graphic element), from a local drive or device, a third-party site, or any other site.

In some embodiments, the user 10 may decide to add a validation type (e.g. from a third-party service) of any particular data point. Multiple validations of the same data point may be used such as, for example, a prior years' annual income from the user's accountant (CPA) and from the IRS.

In some embodiments, a synthetic Data PII data structure may be generated thus providing a trusted data source with data analysis without touching on Regulatory categorized PII.

In some embodiments, the AI/algorithm/rules module 43 may generate an alternative data structure extracting certain data from the user's data structure. The extracted data structure may only include synthetic data values based on data schemas such as iLAD, ULAD, MISMO as well as other dataset specifications.

In some embodiments, the AI/algorithm/rules module 43 in generating the Synthetic data may make an analysis to classify the certain values in the user's data structure to determine the values of certain assumptions that it will use to generate the synthetic data. For example, the AI/algorithm/rules module 43 may calculate based on the Value assumptions and the user PII Print values utilizing various standard industry ratios. For example, for Mortgage lending, qualification ratios may be used such as PITI-Housing Debt/Payment to income.

In some embodiments, a type A1-A table(s) of Ratio values may be outputted based on existing (and historical) factors. A Synthetic representation of the PII Print may used for prequalifying a user within the platform that has access to the assumption value keys. Regarding the input for generating the Synthetic representation of the PII Print, the value assumptions may be replaced.

In some embodiments, new loan assumptions (e.g. principle, Amortization and interest) may be used in the analysis to calculate values representing Key lending qualification ratios. For this particular case, the extracted data structure that was generated may only be useable to a third party, provided authorization by the user 10, who had certain assumptions used. The output may a type X1-Xn table(s) of Ratio values based on theoretical factors. Data Tables may be held in separate containers (or another secure architecture). A zero-trust method (or other secure architecture) may be used to identify matching profile to the candidate profile that a potential provider is looking for.

In some embodiments, the user 10 via the YP platform may provide a user input interface for third party providers. The user (consumer) may augment the user's data held by a third party, such as for example, the user may add an explanation to their credit history held by a credit repository. The user may upload data to their CPA's software. The interface may provide the user data needed to automatically complete loan applications, and to automatically completing a government benefits application. The interface may provide the user data needed for on boarding with a certified financial planner (CFP), and/or a wealth planner.

In some embodiments (e.g., a daily consumer usage example), the UI may allow the Consumer User to opt in to a credit provider request, and/or to find a provider of services in the market place and to engage them. The UI may provide Friend recommendations and matched user Reviews.

In some embodiments, regarding Peer Recommendations qualified by PII, the identity of the recommender may be anonymous unless the recommender chooses otherwise. The YP platform may provide the ability for the user to define when the identity of the recommender may be anonymous or not. Peer-to-peer (P2P) recommendations may be one of the biggest influencers in a user (consumer) making a product decision. Many products where "personalization" may be a new elective feature, in financial products, because of risk profiling, financial parameters and risk. One of the goals of the providers of consumer finance may be that the basic product itself needs to fit a specific consumer profile. The financial profiles of different users may be very different, which may create different risk profiles for a provider of consumer finance. For example, with regard to certain types of loans (e.g. mortgages), if the financial profile of user1 is much different than that of user 2, the product (a Home Equity Line of Credit Mortgage) that user1 was offered and possibly received may not be available to user2. However, the amount of detail and complex calculations needed to make these assessments are not usually practical (due to knowledge of the calculations and the weighting of importance of the factors), nor possible (due to user1's desire for privacy and/or information that will not be shared with user2). Due to this, the power of Peer-to-Peer recommendations may become much more limited in financially qualified products, since the ability for the consumer to know the recommender's financial situation is relative to their own.

In some embodiments, third party providers (e.g., marketplace) may also have accounts for using the YP platform. The third-party providers who have an account on the YP platform may include but is not limited to:
   (1) Budget Counseling NGOs
   (2) Budget Counseling online services (APPS)
   (3) CPA's
   (4) Wealth Management providers
   (5) Wealth Management online services (APPS)
   (6) Government needs-based programs
   (7) Financial Literacy NGOs
   (8) Home Ownership readiness program providers
   (9) Credit repositories (Experian, Transunion and Equifax)
   (10) Mortgage lenders

(11) Loan Origination Software Publishers (Elli Mae)
(12) Banks (from community to Large multinational)
(13) Credit Unions
(14) Independent developers of software (APPS) that do any of the above, or any combination thereof
(15) Data Aggregators
(16) Non-financial provider advertising In some embodiments, some of the entities above may use an API (Application programming interface) that will integrate with their Enterprise software system with the YP platform. For example, in certain cases the Publisher, such as a loan origination software publisher, may have the API integration built-in for any lender using the software, who is also a member of the system managing the YP platform. Providers may create parameter factors and weight them (e.g. prioritize them) with the Generic PII MAP tool.

In some embodiments, other functionality may include autonomous matching of the synthetic data of the user 10. This may be done on two levels in the YP system master guide (e.g., autonomous software agent) and individually with the user 10 if they may have allowed that function for the provider type.

In some embodiments, the market place may include a credit provider that may define Profiles, elements, targets etc. Messaging may be seen before the consumer has opted in. Incentives may be provided to consumers. Autonomous agent matching caudate profiles.

For example, the Autonomous Agent may identify a consumer with a profile sought by ABC bank and XYZ Credit card company, who are willing to give $50 (or a toaster) to the consumer for signing up. Assuming the particular consumer has not already permissioned getting such offers, the YP system may display a message to the consumer utilizing the optimal UIX that "if you want to opt in now, there are two companies willing to give you a $50 (or a toaster) for signing up", for example.

In some embodiments, opt-in levels may be pull vs push, such as third-party apps receiving data from YP platform more efficiently than the user inputting and providing the data directly. The user may ultimately have the control that no company will automatically get PII data other than anonymized data with hash general setting.

In some embodiments, the Market Place Providers Platform may have credit providers defining profiles, elements, targets etc. Messaging may be seen before the consumer has opted in. Incentives may be provided to the consumer. Autonomous agent matching caudate profiles, Opt in levels, and API integration with credit providers account origination software.

In some embodiments, while education may be provided mainly through providers in the market place, the system may provide tools to qualified developers, utilize the same elements described in the optimal UIX (Psychographics etc. etc.) to help optimize motivation, attention span, and cognitive enjoyment of the user.

In some embodiments, the YP platform is a tool for the user on an ongoing basis to understand, to start any journey they choose, and end up at any of these companies better prepared and easier to work with. Today to fill out a loan application, the user works hard, and may not understand the entire flow. The YP platform may become part of the consumer routine where the user is more cognitive and educated about their financial choices while retaining more control and transparency.

In some embodiments, due to the economic/market limitations that may be caused by imperfect and asymmetric information, it may not be possible to efficiently address the inefficiencies of imperfect and asymmetric information comprehensively. The YP platform creates the possibility to example these limitations while maintaining privacy and providing a depth of knowledge in the weighting and calculations. The Peer-to-Peer recommendations may be done with user1 utilizing know how and user2 PPI even though user1 does not possess either one.

In some embodiments, the YP platform may enable the consumer to receive remuneration from the YP platform or third parties for the use of the user's PII.

The embodiments in this disclosure herein disclose for a specified user or consumer, the steps of:
1. Opening an account with field inputs or scanning IDs
2. A login portal allowing the user to log in to their various online accounts
3. The YourPii application may allow the user to aggregate their own data from online accounts:
    a. The client may log into their bank account From within the YP Application (through the use of a vendor such as Akoya, for example) and may (options) download PDF statements, Screen scrape account information from browser, and/or download data.
    b. With the user's authorization, multiple possible data sources may be identified through the YourPII app personal profile crawler that utilizes the AI/algorithm/rules module 43 in the PI Print application to identify sources such as a bank credit card on the credit report, or the interest reported on a 1099 form.
4. The YourPii application extracts (if needed), analyzes the data, and classifies the data. The data may then be encrypted
    a. A bank account statement may be identified as high descriptive sensitive financial data and classified as based on a personal economic data structure value class (see below)
5. The YourPii application may stores data in separate secure containers based on data classification.
6. The YourPii's PII Print application using the AI/algorithm/rules module 43 may extract data (if needed such as extracting a DOB from an image of a Driver's license) and analyzes the data based on demographic, behavioral, psychometric, psychographic factors as well as other methods used for human profiling, hereinafter referred to as Life Path Trend Profile (LPTP).
7. The YourPii's PII Print [Personal Economics (PE)] application using the AI/algorithm/rules module 43 may extract data (if needed such as extracting account balances from a Bank Statement downloaded as a PDF), analyzes the data, and tags the data such with data types such as income, debt, payment obligations, liquid assets, non-liquid assets, direct liabilities, contingent liabilities, and other data relating directly or indirectly to financial factors. Tags may be metadata, or a data value expressed in a particular data standard, predefined data schema, or syntax. The metadata, data standard, schema, or syntax may include at least one standard from industry, NGO (organizations or open source) and/or Government agencies, including Uniform Loan Application Dataset (ULAD), Uniform Residential Loan Application (URLA), The Mortgage Industry Standards Maintenance Organization (MISMO), eXtensible Business Reporting Language (XBRL), Object Management Group® (OMG®) and the like.
8. The YourPii's PII Print application using the AI/algorithm/rules module 43 based on steps 6 and 7 hereinabove may generate two and/or three vectors in the data structure. Each YourPii PII Print application may create its own data structure such as one where the data points are exclusively PE factors and another one where the data points are exclusively LPTP factors. Each point in these data structures may represent a unique value including:

a. An element value (e.g. date of birth DOB)
b. How the values of two elements are related and expressed mathematically. For example, it may be the sum of one element value divided by another or another factor such as annual debt payments divided by annual income, for example.
c. The data source and/or type of a particular elemental value (e.g. DOB retrieved from Driver's License (DL))
d. The date of the relevant data source and/or type of a particular elemental value (e.g., a valid DL or if an elemental data value is dynamic, e.g. a bank account balance that may change periodically with the month and day of the statement).
e. A binary factor—even if a data structure element or point (e.g. "d" above) may still be valid, such as an 8-month-old bank statement. The 8-month-old bank statement may not be relevant by itself. However, a current statement with two previous statements may show a trend, whereas the 8-month-old bank statement may not be valid on a standalone basis.
f. A score value rating indicative of the data source validating factor value (e.g. "d" above). The data source with a lower score may be assigned to a copy of a paycheck as a validation for the source of income. However, income data retrieved from the IRS website or another trusted third party may have a higher score value.
g. Demographic elemental values such as Gender and/or in "c" above
h. Demographic values relating to the current quality, age, or presence in the data structure elemental values (like "d" above) which is true for all elemental data types.
i. Psychographic elemental values based on social issues that the individual may have expressed interest, based on what was last retrieved from Social Media (step 108) and/or spending habits (step 112) based on analysis of credit card or bank account statements.
j. Psychographic values related to the current quality, age, or presence in the data structure elemental values (like "d" above)
k. Behavioral elemental values (based on user's usage history of the method, or retrieved from Social Media, data from analysis of credit card or bank account statements, responses to requests for direct user input (step 116), which may be binary, multiple choice or direct field input from the GUI 70.
l. Behavioral values relating to the current quality, age, or presence in the data structure elemental values (like "d" above).

9. The YourPii application may design an optimal UIX for the user, based on the input of certain data structure values into the Your PII UI engine. The analysis may include the following:
a. Demographic factors
b. Psychographic factors
c. Behavioral factors
d. Current best practices in UI design including
  i. Decision Fatigue
  ii. Other cognitive psychology factors that comes in effect with the field of interface design.

10. Based on the results (output) of the Your PII UI engine in step 8, the YourPii application may choose from a library of UI themes and graphical elements.
a. These themes and graphical elements may be part of the YP generated library or generated by third parties. This may include elements from well-known designers at a cost if the user chooses.

11. Based on the results (output) of the Your PII UI engine in steps 8 & 9, the YourPii application may provide the user a series of a binary choices to refine, and to check the user interface and experience definitions 12. Based on the User choices (which may include the ability to visualize or try various UI configurations), a UI configuration may be generated and presented as the UI of the Users YourPII app.

13. The user may be able to redo the process laid out above.

14. The Your PII UI engine using the AI/algorithm/rules module 43 may use each set of results to help train the AI engine (e.g., machine learning models) and may ask the user if the user is willing to become an active participant in a test group [e.g., to define community development design group]

15. User interface and experience may allow the user to skip step 11 (binary) and allow the YourPII platform to just create a UI.

16. Step 11 may iterate the UIX based on parameters determined in steps 6-8.

17. The YourPii application may analyze what data is missing (e.g., gap analysis) from the PII Print.
a. The YP platform may continuously identify missing data and/or values within the user's various data structures.
b. These missing values may be prioritized by various values that may be dynamic, including the intent of the user whether that has been stated or has been derived from the AI/algorithm/rules module 43.

18. The YP platform may guide the user (depending on the UIX defined in the previous processes) which may include explaining what factors are missing, why the particular factors are important, and how to add them to their YP Vault, which may include inputting data through the personalized UI (icons, dropdowns, field fill, and/or through any other graphical elements), from a local drive or device, a third party site, as well as other sources.

II. The uses of the herein disclosed embodiments may include:
a. (Consume/User)
  Opting in to a credit provider request
  Finding a provider of services in the market place and engaging them
  Friend recommendations
  Matched User Reviews
b. Credit Provider
  Provider defines
  Profiles elements targets etc.
  Messaging seen before consumer has opted in
  Incentives to consumer
  Autonomous agent matching caudate profiles
  Opt in levels
  API integration with Credit providers account origination software
c. Provider (products and services other than credit)

Figure 7:
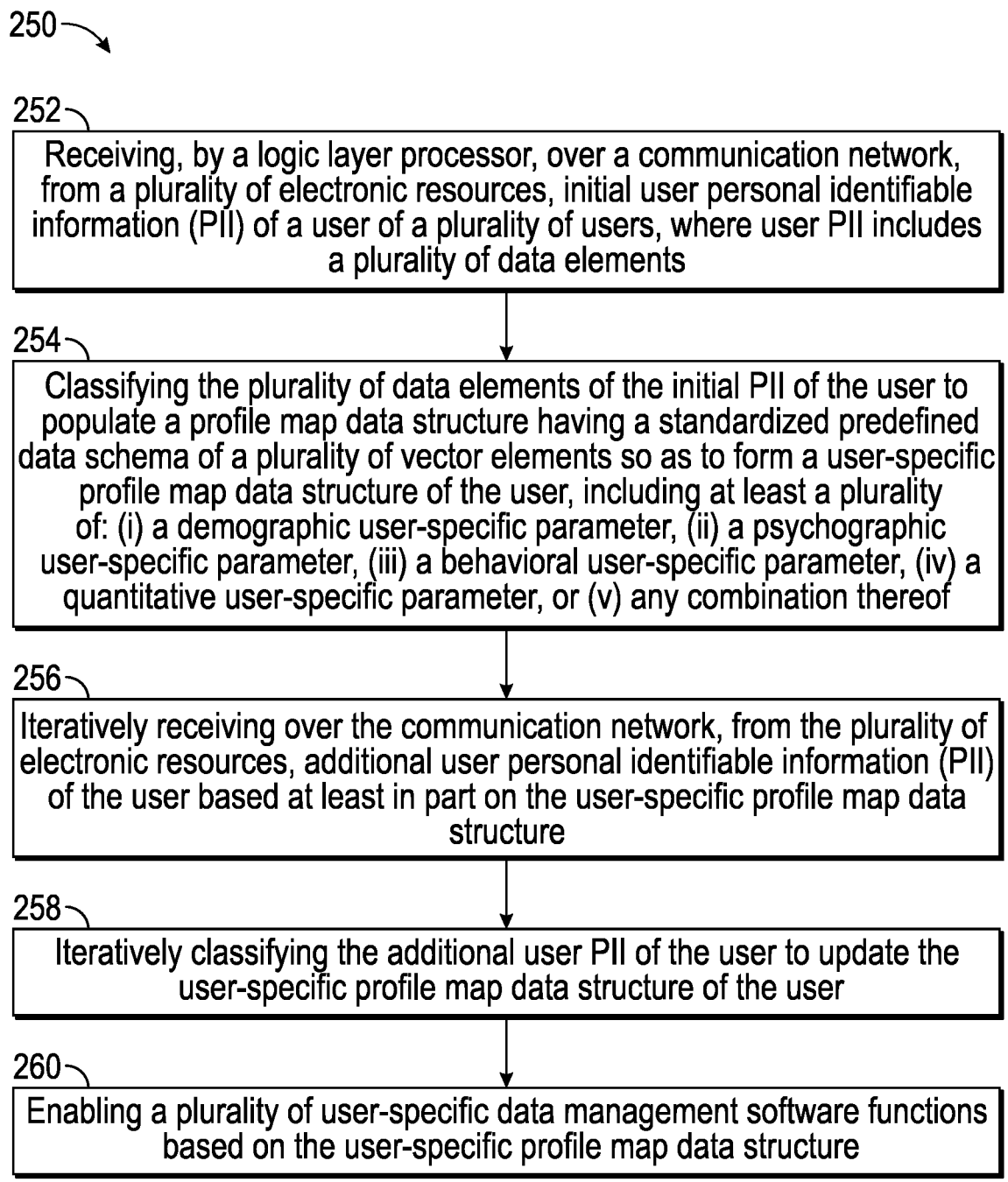
FIG. 7 is a flowchart of a method for self-aggregation of personal data and personal data custody, control, and stewardship in accordance with one or more embodiments of the present disclosure.

FIG. 7 is a flowchart of a method 250 for self-aggregation of personal data and personal data custody, control, and stewardship in accordance with one or more embodiments of the present disclosure. Method 250 may by performed by the logic layer processor 40 of the server 15.

Method 250 may include receiving 252, by a logic layer processor, over a communication network, from a plurality of electronic resources, initial user personal identifiable information (PII) of a user of a plurality of users, where user PII includes a plurality of data elements.

Method 250 may include classifying 254 the plurality of data elements of the initial PII of the user to populate a profile map data structure having a standardized predefined data schema of a plurality of vector elements so as to form a user-specific profile map data structure of the user, including at least a plurality of: (i) a demographic user-specific parameter, (ii) a psychographic user-specific parameter, (iii) a behavioral user-specific parameter, (iv) a quantitative user-specific parameter, or (v) any combination thereof.

Method 250 may include iteratively receiving 256 over the communication network, from the plurality of electronic resources, additional user personal identifiable information (PII) of the user based at least in part on the user-specific profile map data structure.

Method 250 may include iteratively classifying 258 the additional user PII of the user to update the user-specific profile map data structure of the user.

Method 250 may include enabling 260 a plurality of user-specific data management software functions based on the user-specific profile map data structure.

In some embodiments, the term transformed user-specific PII may refer to synthetic data, anonymized data, Readable PII, Metadata, or any combination thereof.

Figure 8:
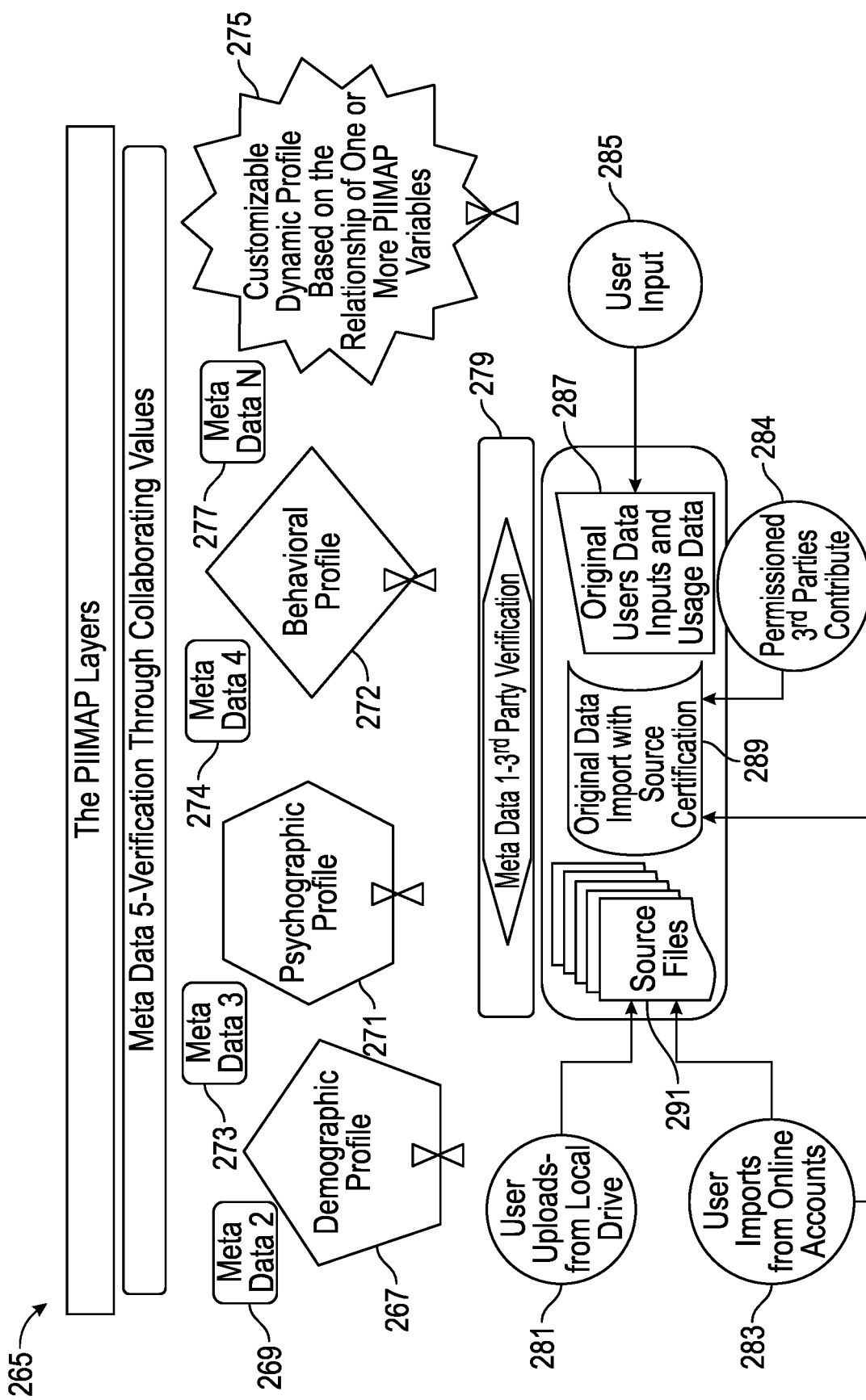
FIG. 8 depicts PIIMAP Layers in accordance with one or more embodiments of the present disclosure.

FIG. 8 depicts PIIMAP Layers 265 in accordance with one or more embodiments of the present disclosure. The PIIMap Layers may include but are not limited to Metadata 1—third party verification 279, a demographic profile 267 and metadata 2 269, a psychographic profile 271 and metadata 3 273, a behavioral profile 272 and metadata 4 274 and customizable dynamic profile based on financial ratios 275 and metadata N 277. Source files 291 may include data that the user may upload 281 from a local drive and/or data that the user imports 283 from online accounts. The data that the user imports from online accounts 283 and/or permissioned third-party contributions 284 may be original data imports with source certification 289. User inputs 285 may include original user's data inputs and usage data 287.

Figure 9:
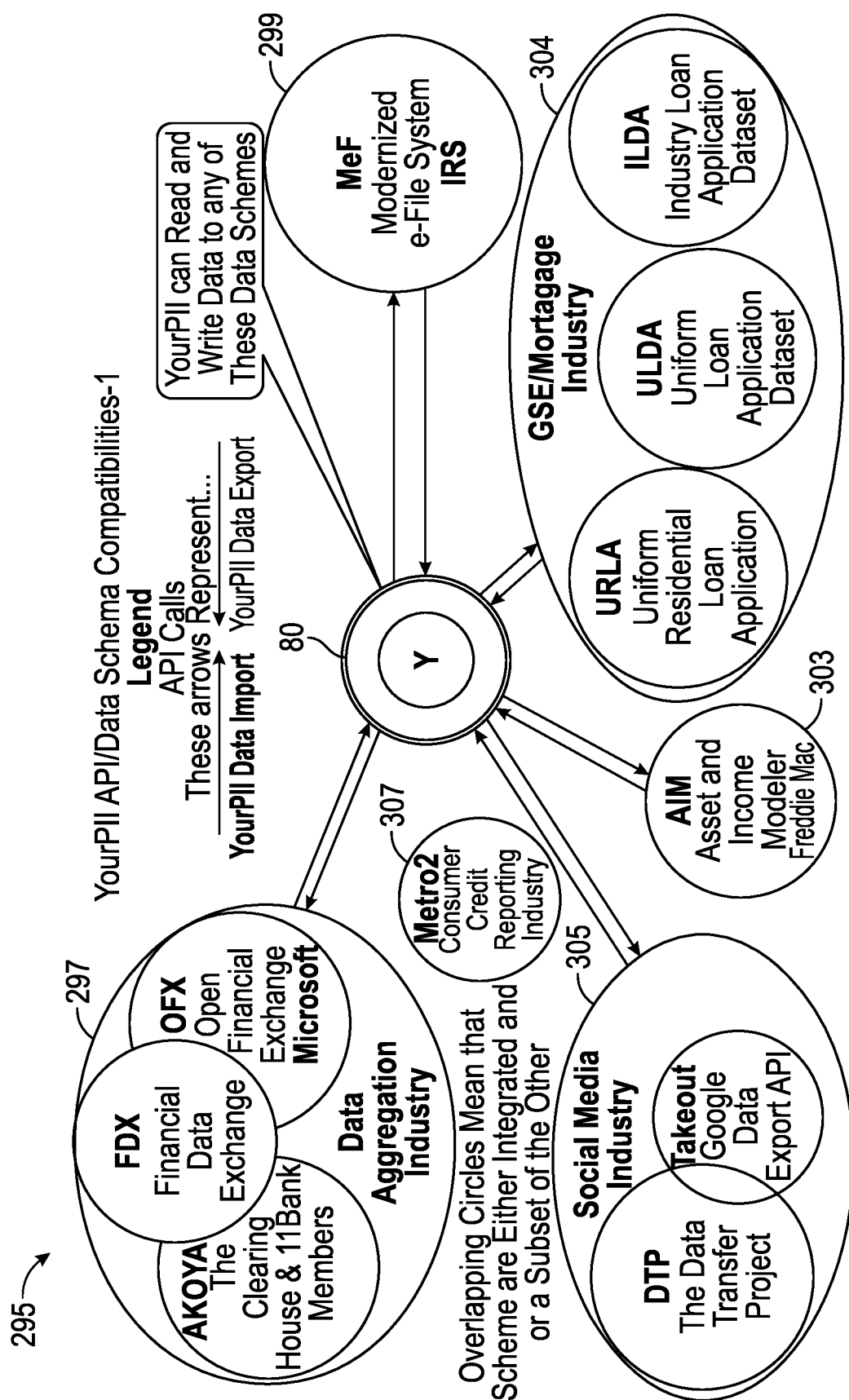
FIG. 9 depicts application programming interface (API) and Data Schema compatibilities in accordance with one or more embodiments of the present disclosure.

FIG. 9 depicts application programming interface (API) and Data Schema compatibilities 295 in accordance with one or more embodiments of the present disclosure. The YP platform 80 may allow data imports and/or data exports with a plurality of API/Data Schema compatibilities which may include Data Aggregation Industry 297 (schema from Akoya company, FDX, and OFX), Modernized e-file System (MeF) 299, GSE/Mortgage Industry 301 (URLA, ULDA, and ILDA), Asset and income Modeler (AIM) 303 such as Freddie Mac, social media industry 305 such as DTP and Takeout, Metro2 307 (Consumer Credit Reporting Industry).

Figure 10:
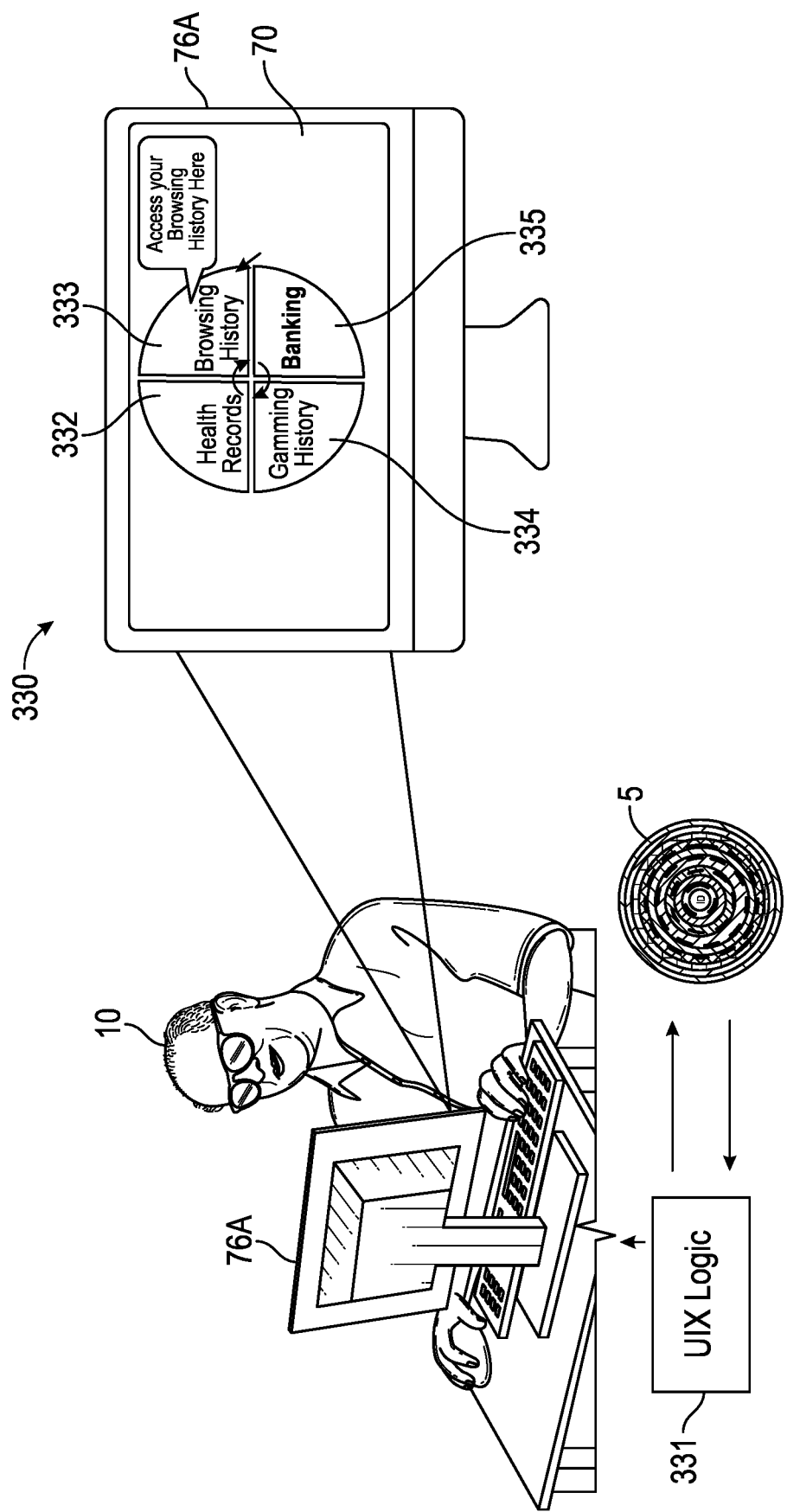
FIG. 10 depicts a third exemplary screenshot of a graphic user interface in accordance with one or more embodiments of the present disclosure.

FIG. 10 depicts a third exemplary screenshot 330 of the GUI 70 in accordance with one or more embodiments of the present disclosure. The third exemplary screenshot 330 may be displayed on the GUI 70 on the display 76A for allowing the user 10 interacting with PIIMAP 5 via UIX logic 331 with graphical elements such as for example, health records 332 of the user 10, browsing history 333 of the user 10, gaming history 334 of the user 10, and banking 335 of the user 10. The third exemplary screenshot 330 is an example of an optimal UIX generated specifically for the user 10 based on his PIIMAP.

The embodiments of the method and system for self-aggregation of personal data and personal data custody, control, and stewardship as disclosed hereinabove are not limited to financial use cases, but may also be applied to digital advertising. Consumers (users) may prefer receiving targeted content and advertisements from entities in the advertising industry. Conversely, these entities need the consumer's behavioral and/or demographic personal data to be able to target advertisements and/or user-targeted content. However, data privacy rights and/or new data privacy regulations may prevent the collection of this personal data of the consumer without consent. Typically, these entities have obtained this behavioral and/or demographic personal data of the consumer through cookie-tracking based on websites previously visited by the consumer. Regulatory requirements and consumer awareness of privacy right are changing the landscape quickly for these entities by phasing out third-party cookies to first-party data thus decreasing reliance on cookies. The YP platform may be in place of, or may significantly enhance cookies, identifiers and other methods used by online advertisers.

Figure 11:
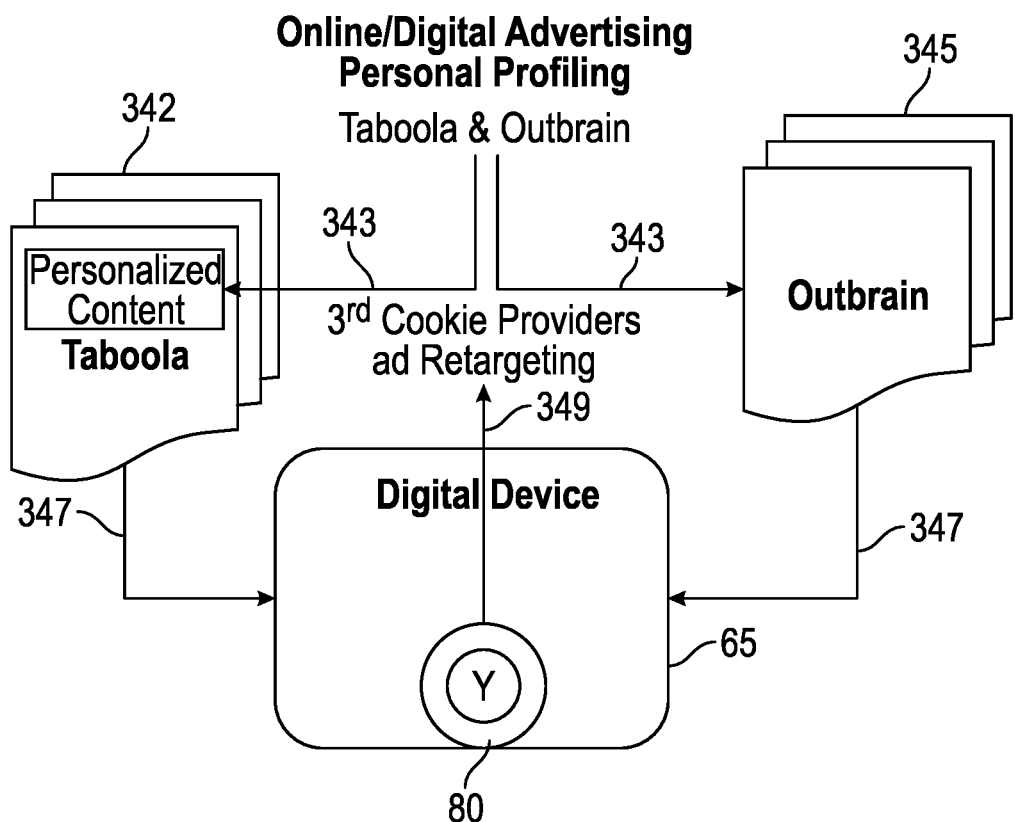
FIG. 11 depicts an exemplary flow diagram for a first use case in accordance with one or more embodiments of the present disclosure.

FIG. 11 depicts an exemplary flow diagram 340 in accordance with one or more embodiments of the present disclosure. Normally digital advertising providers like Taboola 342 and Outbrain 345, for example, may track cookies 343 on the user's computing device 65. However, in some embodiments, Taboola 342 and Outbrain 345 may request 347 PII data from the YI platform 80 in order to tailor and provide user-specific advertisements to these digital advertising providers. In response to the request 347, the required PII data 349 may be sent to these providers for ad retargeting.

In some embodiments, the YP platform 80 for self-aggregation of personal data and and personal data custody, control, and stewardship as disclosed herein may be used to:
(1) To educate the user of the value of their PII that is shared with advertisers,
(2) To educate the user as to what data the advertising industry needs and why,
(3) To designate a portion of the user's PII in the PII MAP 5 with proper assess rights that may be shared with these entities of the advertising industry in real time,
(4) To provide an anonymized portion of the PII data available for targeting and personalized advertising content from third party providers of advertising providers.

The embodiments of the method and system for self-aggregation of personal data and personal data custody, control, and stewardship as disclosed hereinabove are not limited to financial use cases, but may also be applied to legal services profiling and matching. The YP platform for this use case may be used to help the consumer who needs to represent themselves, identify the set of available "Access to Justice" (A2J) resources that best match their particular needs using the PII MAP 5 as previously described as follows:

Step 1: Intake Interview

In some embodiments, an online interview driven by artificial intelligence (AI) may mimic the personalized question and answer (Q&A) flow of a human A2J resource interview. The self-represent litigant (SRL) may be guided via GUI 70 to fill in information based on their specific situation. The information/documentation may be retained, so the Consumer SRL (user) does not need to repeat the same steps as they move to different support providers. The user retains secure control of the user's personal data. The user's consent may be needed when they wish to share their information with specific resource organizations and/or professionals.

Step 2: Profile Generation

In some embodiments, the interview data may be analyzed by YP platform with the AI/algorithm/rules module 43 with PII MAP models and YourPII Runtime application. The algorithms may automatically and quickly create an individualized profile for the SRL [e.g. based on the PII MAP needs-based services and county regulations that can be personalized]. Each unique profile may include key demographic and historical data. The matching engine may recommend suitable prioritized resources.

Step 3: Matching Basic Parameters of the Consumer to Resources

In some embodiments, based on the PIIMAP 5 and the legal parameter data, the matching engine may apply artificial intelligence algorithms to match the case type and categorical profile factors of the A2J consumer and constituency profiles and other parameters of the A2J resources in the system.

Step 4: Resource Availability Estimation and Permissioned Delivery

In some embodiments, resources may establish preferred SRL profiles and may prioritize each consumer SRL profiles against it or dynamic factors such as their workload resources available. The resources may authorize system default or provide estimated timeframes of their availability. Through the YP platform. the Consumer SRL (user) may determine the level of information to share with a particular A2J resource based on the consumer's preference and the range of information that the A2J resource has stated that they need and explained why. The consumer may be prompted on the GUI 70 as to what are the possible ramifications of sharing or not sharing certain data.

Step 5: Matching of Consumer SRL to Resources with Detailed Consumer Information In some embodiments, the matching engine may use artificial intelligence algorithms to identify the most appropriate resources based on Permissioned Detailed Consumer SRL personal file (e.g., PIIMAP 5 with Litigation Permissioned data including uploaded files). In other embodiments, the matching engine may use artificial intelligence algorithms to identify the most appropriate resources based on case type and categorical profile factors, and to delivers upload/imported files to the resource.

Step 6: Consumer Dashboard with Potential Resources Displayed to the User

Figure 12:
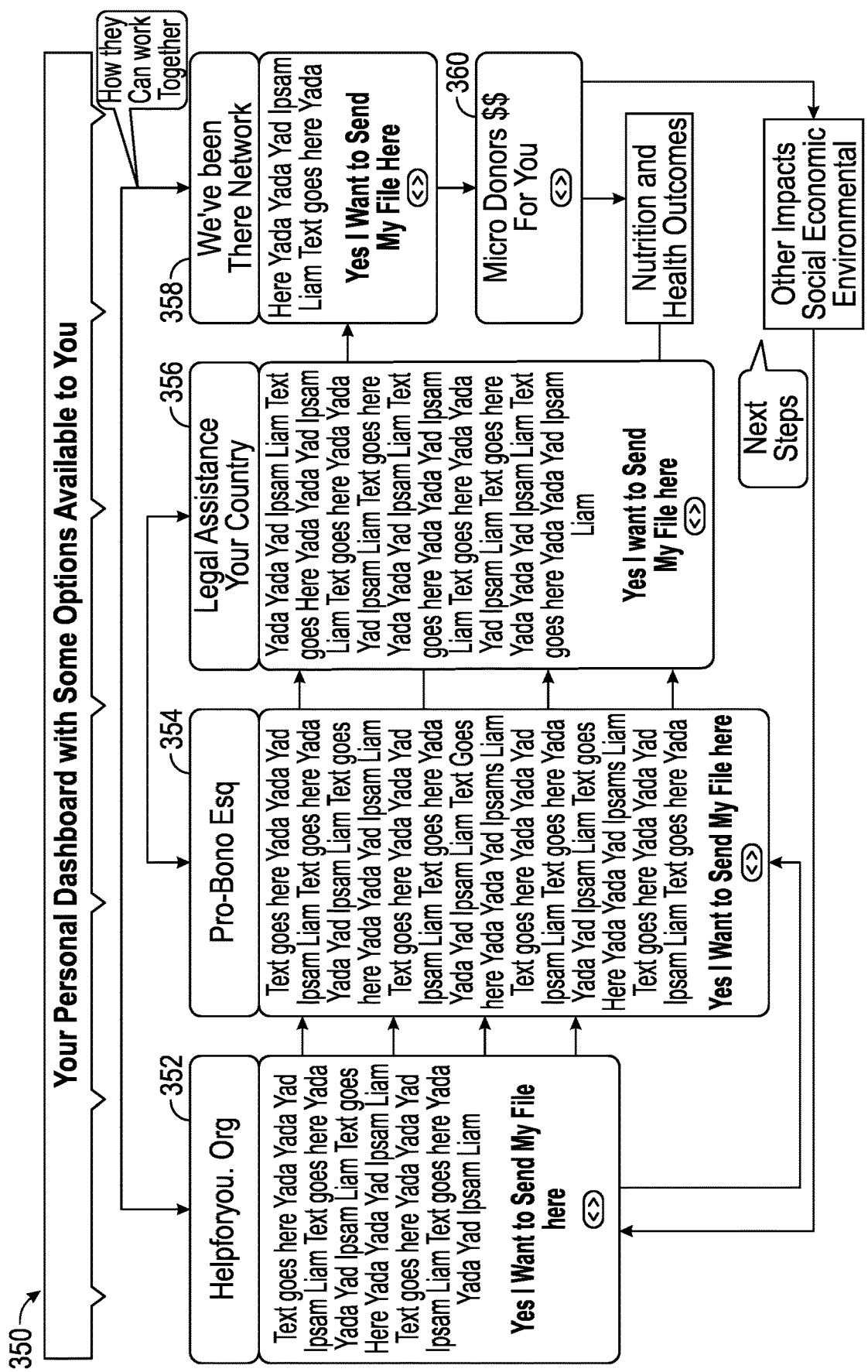
FIG. 12 depicts a fourth exemplary screenshot of a graphic user interface in accordance with one or more embodiments of the present disclosure.

FIG. 12 depicts a fourth exemplary screenshot 350 of the GUI 70 in accordance with one or more embodiments of the present disclosure. Potential resources may be displayed to the user 10 such as for example, HelpforYou.org 352, Pro-bono Esq 354, Legal Assistance your County 356, We've been There Network 358, and MicroDonors $$ For You 360.

In some embodiments, based on results and responses, the system may sequence the resources and their availability into a workflow, and may create an optimized plan of resources and possible interactions. The user 10 (e.g., the consumer) may be shown potential available resources in a dashboard format on the GUI 70, so the user 10 may understand who the resource is and how that resource may be help the user. The consumer may be shown how resources may be able to work together and potential next steps. The consumer may choose whom the user wants to use and to receive services from.

Step 7: Consumer SRL On-Boarding and Hand Off to Resource

In some embodiments, each resource may specify their own next step procedure. The consumer's SRL file may be safely stored in the system available only to the chosen resources and based on the resources the consumer has grant access right permissions. At this point, the hand off between the consumer and the chosen resource is complete. The consumer's SRL file may stay with the resource for a predetermined period of time unless the consumer extends the time period. The consumer SRL interactions are directly with the resources that they have chosen. Depending on the level of data sharing previously granted permission rights by the consumer, the consumer may choose to share more information with the chosen A2J resource(s) so as to enable the resource to start their onboarding process.

Figure 13:
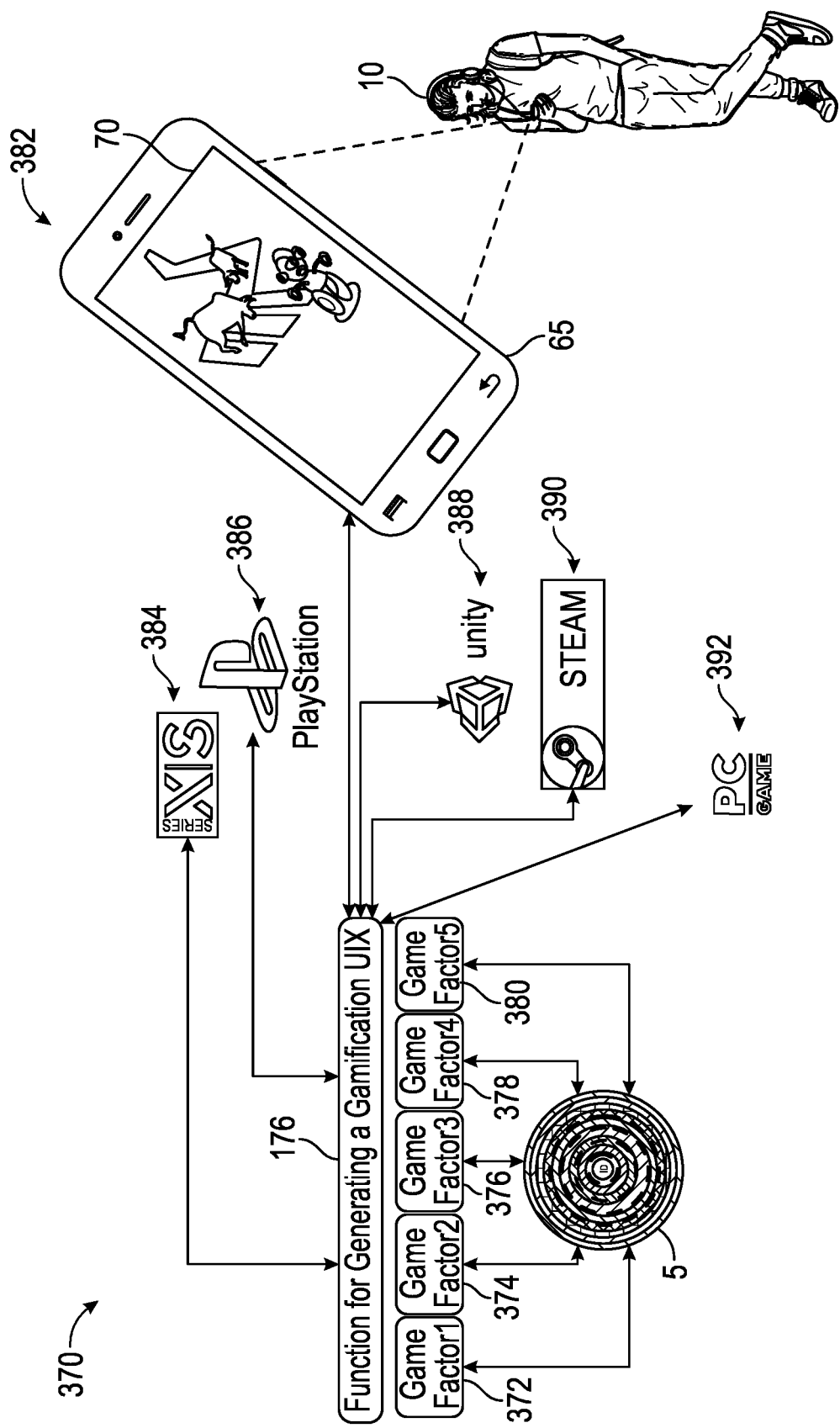
FIG. 13 depicts an exemplary flow diagram for a second use case in accordance with one or more embodiments of the present disclosure.

FIG. 13 depicts an exemplary flow diagram 370 for a second use case in accordance with one or more embodiments of the present disclosure. The second use case shown in FIG. 13 is generates a game design and logic UIX 382 for gamers that may be displayed on the GUI 70 on the computing device 65 of the user 10 using the function for generating a gamification UIX 176 as shown in FIG. 5.

In some embodiments, the PIIMAP 5 may be used by the function for generating a gamification UIX 176 through a plurality of game factors, which may be game design elements or logic elements denoted as Game Factor1 372, Game Factor2 374, Game Factor3 376, Game Factor4 378, and Game Factor5 380. These may be attributes (action level and/or theories) from the YP platform or from third party computing devices. The YP may provide access to the profiling including demographic, psychographic, cognitive, behavioral, and quantitative factors, and game play history. The logic and design elements interacting with the player PIIMAP may come from the YP platform or a third party.

In some embodiments, the function for generating a gamification UIX 176 may generate an output that customizes the game experience for the user 10 on any game platform such as on a personal computer (PC) or mobile device. In addition to the game design and logic UIX 382 displayed on the GUI 70 on the computing device 65 of the user 10, the customized game experience may be outputted to a plurality of gaming platforms such as Series XS 384, Playstation 386, Unity 388, Steam 390, and PC game 392, for example.

Figure 14:
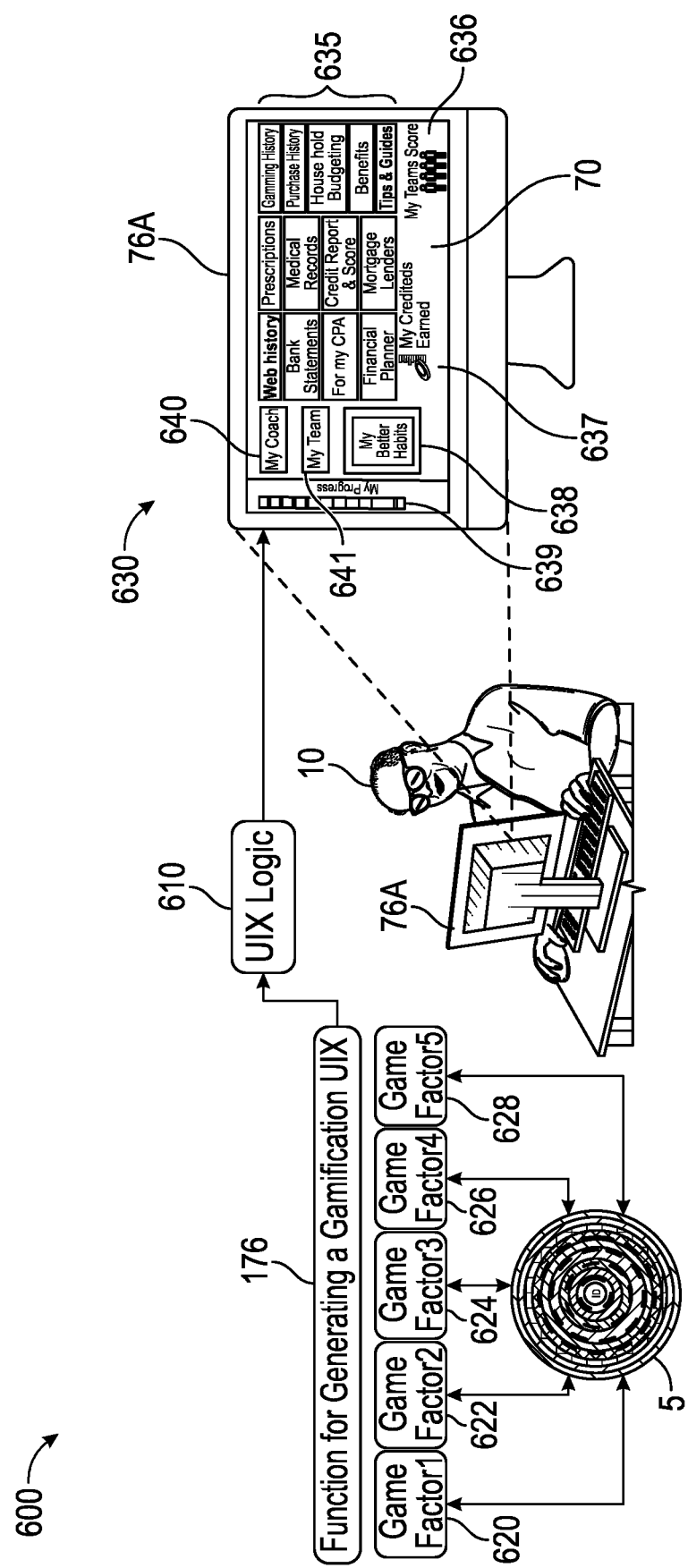
FIG. 14 depicts an exemplary flow diagram for a third use case in accordance with one or more embodiments of the present disclosure.

FIG. 14 depicts an exemplary flow diagram 600 for a third use case in accordance with one or more embodiments of the present disclosure. The third use case shown in FIG. 14 is generates a gamification UIX 630 that may be displayed on the GUI 70 on the display 76A on the computing device 65 of the user 10 using the function for generating a gamification UIX 176 as shown in FIG. 5.

In some embodiments, the PIIMAP 5 may be used by the function for generating a gamification UIX 176 through a plurality of game factors, which may be game design elements or logic elements denoted as Game Factor1 372, Game Factor2 374, Game Factor3 376, Game Factor4 378, and Game Factor5 380. These may be attributes (action level and/or theories) from the YP platform or from third party computing devices. The function for generating a gamification UIX 176 may generate an output that goes to a UIX Logic Controller 610 that creates the unified gamified experience. The gamification UIX 630 may include generated gamification graphical elements 635 such as "Web History", "Bank Statements", "For My CPA", "Financial Planner", "Prescriptions", "Medical Records", "Credit Report and Score", "Mortgage Lenders", "Gaming History", "Purchase History", "Household Budgeting", "Benefits", and "Tips and Guides". Additional graphical elements may include "My Teams Score" 636, "My Credits Earned" 637, "My Better Habits" 638, "My Progress" 639, "My Coach" 640, and "My Team" 641.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), serverless distributed, erasure coding storage, and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, Alexa, smart wearable devices, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. This may include any network architecture such as server less architecture, peer-to-peer, and/or distributed computing architectures.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Smartphone, tablets, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data. There may be two categories of users: (1) the consumer user who aggregates, manages and uses their PII data, and (2) the provider user who is providing goods and services to the consumer based in part on the consumer's PII. The provider user may be in the marketplace where they may be registered and fully integrated with the YP platform, or those provider users that may purchase lead generation services through the YP platform.

Figure 15:
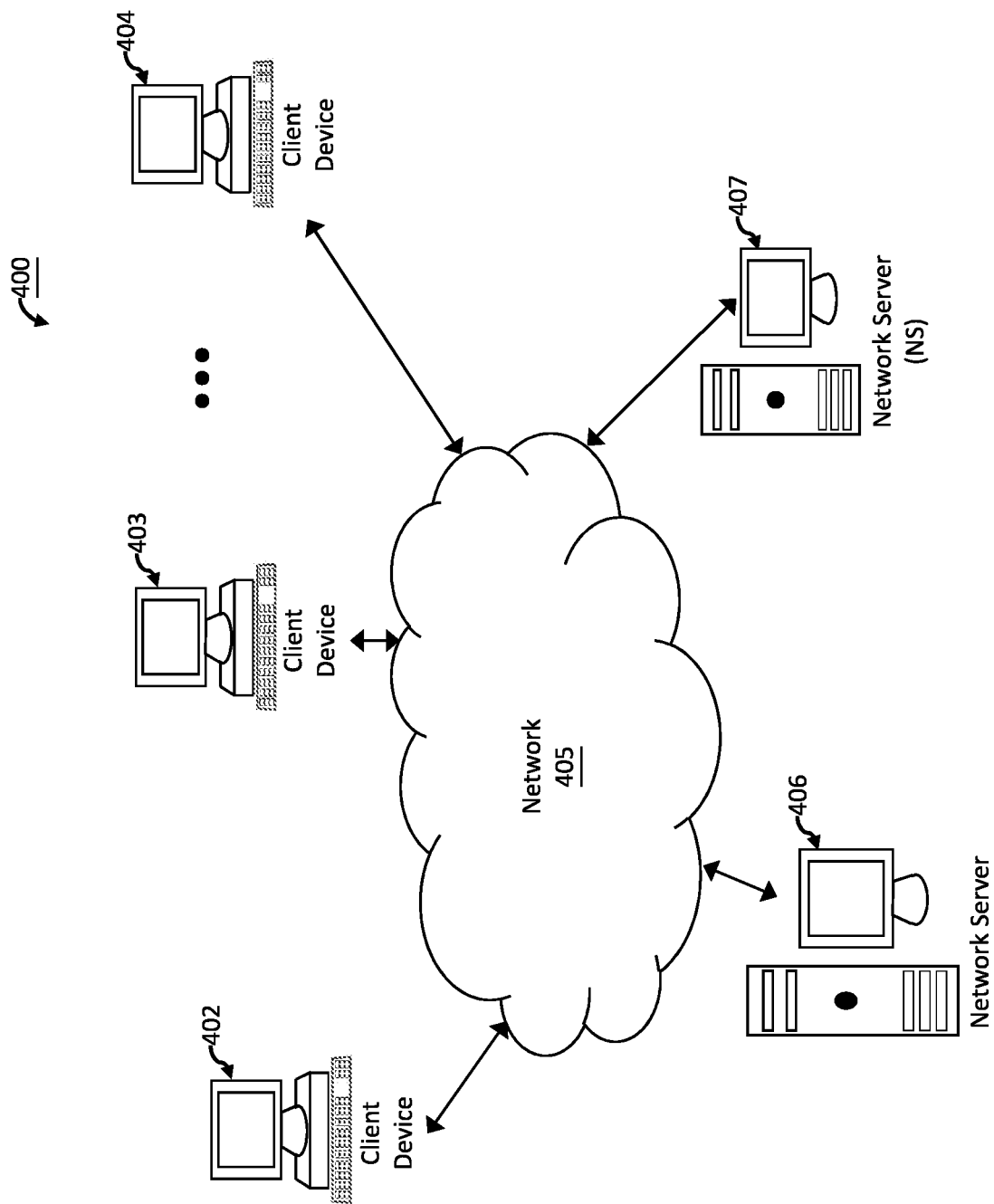
FIG. 15 depicts a block diagram of an exemplary computer-based system/platform in accordance with one or more embodiments of the present disclosure.

FIG. 15 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for accessing the data, caching, searching, and/or database connection pooling. An example of the scalable architecture is an architecture that is capable of operating multiple servers.

In some embodiments, referring to FIG. 13, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 15, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 16:
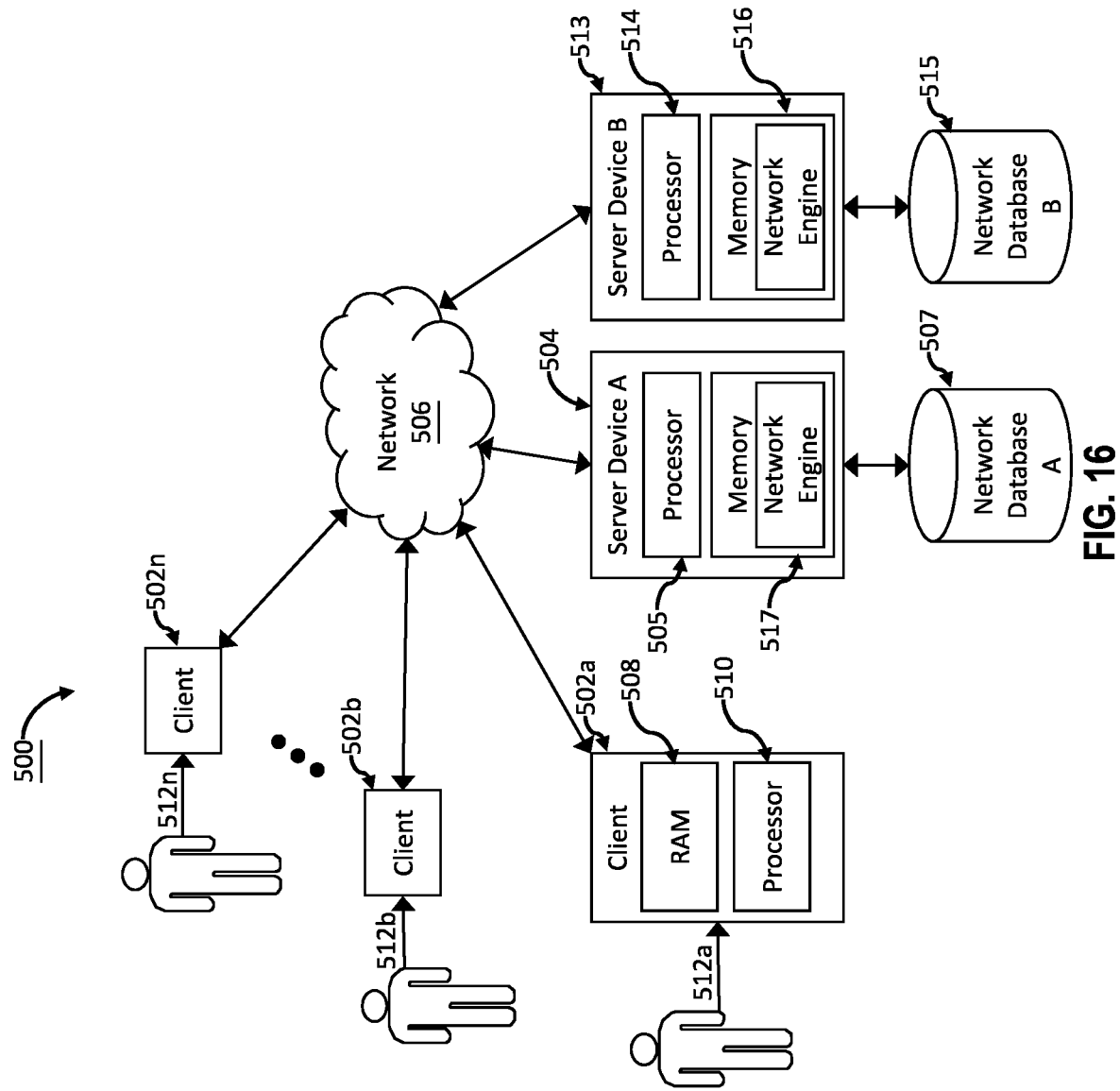
FIG. 16 depicts a block diagram of another exemplary computer-based system/platform in accordance with one or more embodiments of the present disclosure.

FIG. 16 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 502a through 502n may also include a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 16, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 17:
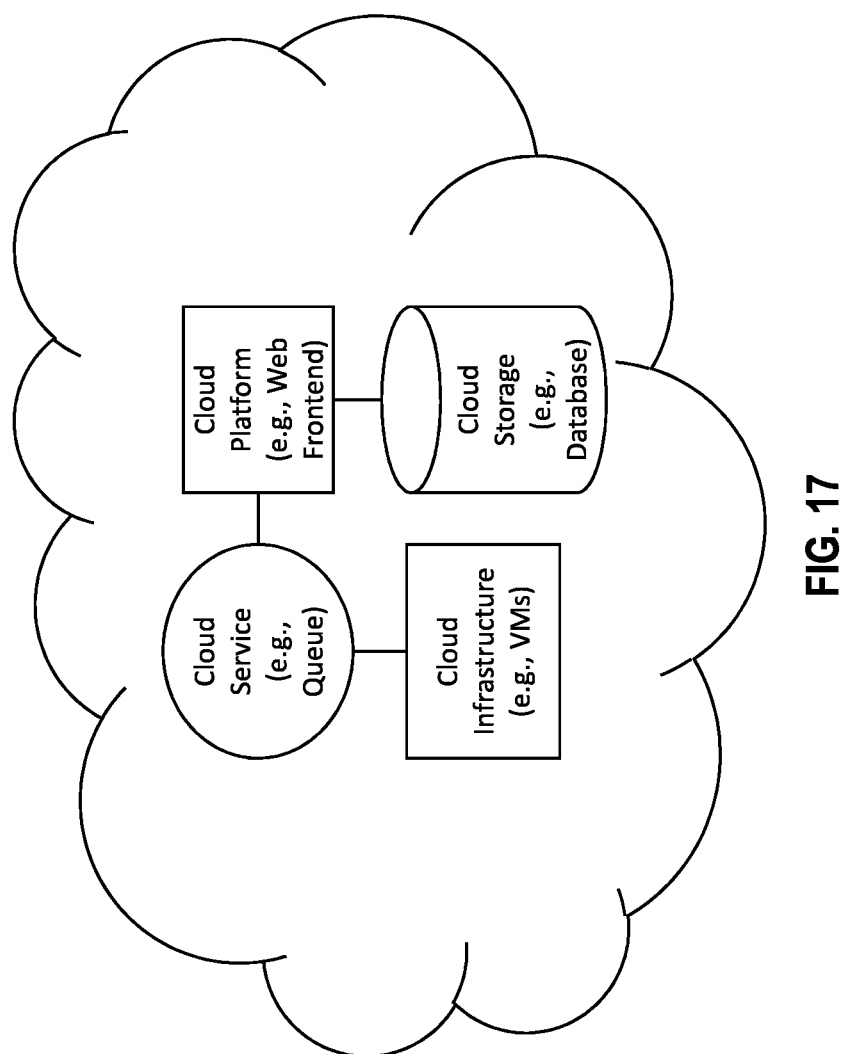
FIGS. 17 and 18 are diagrams illustrating implementations of cloud computing architecture/aspects with respect to which the disclosed technology may be specifically configured to operate, in accordance with one or more embodiments of the present disclosure.
Figure 18:
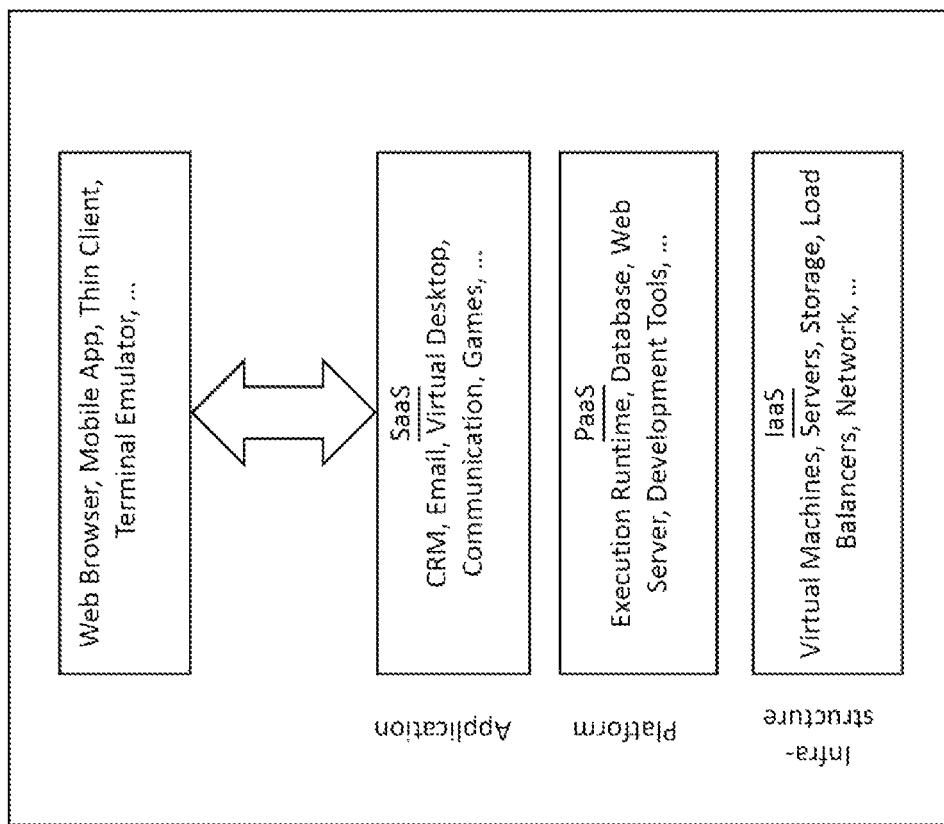

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 17 and 18 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   receiving, by a logic layer processor, over a communication network, from a plurality of electronic resources, initial user personal identifiable information (PII) of a user of a plurality of users;
   where user PII may include a plurality of data elements;
   classifying, by the logic layer processor, the plurality of data elements of the initial PII of the user to populate a profile map data structure having a standardized predefined data schema of a plurality of vector elements so as to form a user-specific profile map data structure of the user, that may include at least a plurality of:
      (i) a demographic user-specific parameter,
      (ii) a psychographic user-specific parameter,
      (iii) a behavioral user-specific parameter
      (iv) a quantitative user-specific parameter, or
      (v) any combination thereof;
   iteratively receiving, by the logic layer processor, over the communication network, from the plurality of electronic resources, additional user personal identifiable information (PII) of the user based at least in part on the user-specific profile map data structure;
   iteratively classifying, by the logic layer processor, the additional user PII of the user to update the user-specific profile map data structure of the user; and
   enabling, by the logic layer processor, a plurality of user-specific data management software functions based on the user-specific profile map data structure.

2. The method according to clause 1, where at least one user-specific data management software function from the plurality of user-specific data management software functions may be configured to generate a user-specific profile interface for display on a computing device of the user based on the updated user-specific profile map data structure of the user; and where the user-specific profile interface may include a plurality of graphical elements that may be configured to:
   (i) allow the user to adjust the user-specific profile map data structure of the user,
   (ii) grant an access right to a person, an entity, or both, to access a portion of the user-specific profile map data structure of the user, or
   (iii) any combination thereof.

3. The method as in any of clauses 1-2, where at least one user-specific data management software function from the plurality of user-specific data management software functions may be configured to anonymize the updated user-specific profile map data structure of the user to generate a synthetic profile map of the user; and
   where the synthetic profile map cannot be used to identify or infer any user identifying data of the user.

4. The method as in any of clauses 1-4, may further include:
   receiving, by the logic layer processor, over the communication network through an application programming interface (API) from a remote computing device of a person, an entity, or both, a request for an access right to a portion of the user-specific profile map data structure of the user.
5. The method according to clause 4, where at least one user-specific data management software function from the plurality of user-specific data management software functions may be configured to grant the access right;
   and may further include:
   extracting, by the logic layer processor, from the updated user-specific profile map data structure, the requested portion of the user-specific profile map data structure of the user; and
   returning, by the logic layer processor, through the API, to the remote computing device over the communication network, the requested portion of the user-specific profile map data structure of the user.
6. The method according to clause 5, where the requested portion of the user-specific profile map data structure of the user may be configured to automatically populate at least one pre-defined software object designated by the person, the entity, or both.
7. The method as in any of clauses 5-6, where at least one second user-specific data management software function from the plurality of user-specific data management software functions may be configured to anonymize the requested portion of the user-specific profile map data structure to generate a synthetic PII of the user;
   where the synthetic PII of the user cannot be used to identify or infer any user identifying data of the user; and
   may further include returning, by the logic layer processor, through the API, to the remote computing device over the communication network, the synthetic PII of the user.
8. The method as in any of clauses 1-4, 6 or 7 may further include:
   validating, by the logic layer processor, at least one data element of the user PII based at least in part on at least one electronic resource.
9. The method according to clause 8, where the at least one electronic resource may be a user-independent electronic resource.
10. The method according to clause 9 may further include:
    accessing, by the logic layer processor, over the communication network, the user-independent electronic resource to validate the at least one data element of the user PII.
11. The method as in any of clauses 1-4, 6-8, or 10, where the plurality of data elements may include at least one form and metadata of the at least one form.
12. The method according to clause 11, where the at least one form may be at least one of: a financial document, a bank statement, a credit card statement, an appraisal document, a home inspection document, a signed contract, a disclosure form, a driver license, a tax return, a W-2 form, a 1099 form, a pay stub, a financial-related document, or any combination thereof.
13. The method as in any of clauses 1-4, 6-8, or 10-12, where iteratively classifying the additional user PII of the user may include iteratively classifying the additional user PII of the user until the user-specific profile map data structure of the user is populated with data that exceeds a predefined data threshold.
14. The method according to clause 13, where the predefined data threshold may be based on demographic factors, psychographic factors, behavioral factors, user interface (UI) design psychology, or any combination thereof.
15. A system may include:
    a non-transitory memory; and
    at least one logic layer processor may be configured to execute computer code stored in the non-transitory memory that causes the at least one logic layer processor to:
    receive over a communication network, from a plurality of electronic resources, initial user personal identifiable information (PII) of a user of a plurality of users;
      where user PII may include a plurality of data elements;
    classify the plurality of data elements of the initial PII of the user to populate a profile map data structure having a standardized predefined data schema of a plurality of vector elements so as to form a user-specific profile map data structure of the user, that may include at least a plurality of:
      (i) a demographic user-specific parameter,
      (ii) a psychographic user-specific parameter,
      (iii) a behavioral user-specific parameter
      (iv) a quantitative user-specific parameter, or
      (v) any combination thereof;
    iteratively receive over the communication network, from the plurality of electronic resources, additional user personal identifiable information (PII) of the user based at least in part on the user-specific profile map data structure;
    iteratively classify the additional user PII of the user to update the user-specific profile map data structure of the user; and
    enable a plurality of user-specific data management software functions based on the user-specific profile map data structure.
16. The system according to clause 15, where at least one user-specific data management software function from the plurality of user-specific data management software functions may be configured to generate a user-specific profile interface for display on a computing device of the user based on the updated user-specific profile map data structure of the user; and
    where the user-specific profile interface may include a plurality of graphical elements that may be configured to:
      (i) allow the user to adjust the user-specific profile map data structure of the user,
      (ii) grant an access right to a person, an entity, or both, to access a portion of the user-specific profile map data structure of the user, or
      (iii) any combination thereof.
17. The system as in any of clauses 15-16, where at least one user-specific data management software function from the plurality of user-specific data management software functions may be configured to anonymize the updated user-specific profile map data structure of the user to generate a synthetic profile map of the user; and
    where the synthetic profile map cannot be used to identify or infer any user identifying data of the user.
18. The system as in any of clauses 15-17, where the at least one logic layer processor may further be configured to:
    receive over the communication network through an application programming interface (API) from a remote computing device of a person, an entity, or both, a request for an access right to a portion of the user-specific profile map data structure of the user.

19. The system according to clause 18, where at least one user-specific data management software function from the plurality of user-specific data management software functions may be configured to grant the access right;
and where the at least one logic layer processor may be further configured to:
extract from the updated user-specific profile map data structure, the requested portion of the user-specific profile map data structure of the user; and
return through the API, to the remote computing device over the communication network, the requested portion of the user-specific profile map data structure of the user.

20. The system according to clause 19, where the requested portion of the user-specific profile map data structure of the user may be configured to automatically populate at least one pre-defined software object designated by the person, the entity, or both.

21. The system as in any of clauses 19-20, where at least one second user-specific data management software function from the plurality of user-specific data management software functions may be configured to anonymize the requested portion of the user-specific profile map data structure to generate a synthetic PII of the user;
where the synthetic PII of the user cannot be used to identify or infer any user identifying data of the user; and
wherein the at least one logic layer processor may be further configured to return, through the API, to the remote computing device over the communication network, the synthetic PII of the user.

22. The system as in any of clauses 15-18, 20 or 21, where the at least one logic layer processor may be further configured to validate at least one data element of the user PII based at least in part on at least one electronic resource.

23. The system according to clause 22, where the at least one electronic resource may be a user-independent electronic resource.

24. The system according to clause 23, where the at least one logic layer processor may further be configured to access over the communication network, the user-independent electronic resource to validate the at least one data element of the user PII.

25. The system as in any of clauses 15-18, 20-22, or 24, where the plurality of data elements may include at least one form and metadata of the at least one form.

26. The system according to clause 25, wherein the at least one form may be at least one of: a financial document, a bank statement, a credit card statement, an appraisal document, a home inspection document, a signed contract, a disclosure form, a driver license, a tax return, a W-2 form, a 1099 form, a pay stub, a financial-related document, or any combination thereof.

27. The system as in any of clauses 15-18, 20-22, or 24-26, where the at least one logic layer processor may be configured to iteratively classify the additional user PII of the user by iteratively classifying the additional user PII of the user until the user-specific profile map data structure of the user is populated with data that exceeds a predefined data threshold.

28. The system according to clause 27, where the predefined data threshold may be based on demographic factors, psychographic factors, behavioral factors, user interface (UI) design psychology, or any combination thereof.

29. The system may include:
a non-transitory memory; and
at least one logic layer processor may be configured to execute computer code stored in the non-transitory memory that causes the at least one logic layer processor to:
receive over a communication network, from a plurality of electronic resources, initial user personal identifiable information (PII) of a user of a plurality of users;
where user PII may include a plurality of data elements;
classify the plurality of data elements of the initial PII of the user to populate a profile map data structure so as to form a user-specific profile map data structure of the user;
iteratively receive over the communication network, from the plurality of electronic resources, additional user personal identifiable information (PII) of the user based at least in part on the user-specific profile map data structure;
iteratively classify the additional user PII of the user to update the user-specific profile map data structure of the user.

30. The method may include:
receiving, by a logic layer processor, over a communication network, from a plurality of electronic resources, initial user personal identifiable information (PII) of a user of a plurality of users;
where user PII may include a plurality of data elements;
classifying, by the logic layer processor, the plurality of data elements of the initial PII of the user to populate a profile map data structure so as to form a user-specific profile map data structure of the user;
iteratively receiving, by the logic layer processor, over the communication network, from the plurality of electronic resources, additional user personal identifiable information (PII) of the user based at least in part on the user-specific profile map data structure;
iteratively classifying, by the logic layer processor, the additional user PII of the user to update the user-specific profile map data structure of the user.

31. A method may include:
receiving, by a logic layer processor, over a communication network, from a plurality of electronic resources, initial user personal identifiable information (PII) of a user of a plurality of users;
where user PII may include a plurality of data elements;
classifying, by the logic layer processor, the plurality of data elements of the initial PII of the user to populate a profile map data structure so as to form a user-specific profile map data structure of the user;
iteratively receiving, by the logic layer processor, over the communication network, from the plurality of electronic resources, additional user personal identifiable information (PII) of the user based at least in part on the user-specific profile map data structure;
iteratively classifying, by the logic layer processor, the additional user PII of the user to update the user-specific profile map data structure of the user;
enabling, by the logic layer processor, a plurality of user-specific data management software functions based on the user-specific profile map data structure.

32. A system may include:
a non-transitory memory; and
at least one logic layer processor configured to execute computer code stored in the non-transitory memory that causes the at least one logic layer processor to:

receive over a communication network, from a plurality of electronic resources, initial user personal identifiable information (PII) of a user of a plurality of users;
where user PII may include a plurality of data elements;
classify the plurality of data elements of the initial PII of the user to populate a profile map data structure so as to form a user-specific profile map data structure of the user;
iteratively receive over the communication network, from the plurality of electronic resources, additional user personal identifiable information (PII) of the user based at least in part on the user-specific profile map data structure;
iteratively classify the additional user PII of the user to update the user-specific profile map data structure of the user;
enable a plurality of user-specific data management software functions based on the user-specific profile map data structure.

33. A method may include:
receiving, by a logic layer processor, over a communication network, from a plurality of electronic resources, initial user personal identifiable information (PII) of a user of a plurality of users;
where user PII may include a plurality of data elements;
classifying, by the logic layer processor, the plurality of data elements of the initial PII of the user to populate a profile map data structure having a standardized predefined data schema of a plurality of vector elements so as to form a user-specific profile map data structure of the user;
iteratively receiving, by the logic layer processor, over the communication network, from the plurality of electronic resources, additional user personal identifiable information (PII) of the user based at least in part on the user-specific profile map data structure;
iteratively classifying, by the logic layer processor, the additional user PII of the user to update the user-specific profile map data structure of the user.

34. A system may include:
a non-transitory memory; and
at least one logic layer processor configured to execute computer code stored in the non-transitory memory that causes the at least one logic layer processor to:
receive over a communication network, from a plurality of electronic resources, initial user personal identifiable information (PII) of a user of a plurality of users;
where user PII may include a plurality of data elements;
classify the plurality of data elements of the initial PII of the user to populate a profile map data structure having a standardized predefined data schema of a plurality of vector elements so as to form a user-specific profile map data structure of the user;
iteratively receive over the communication network, from the plurality of electronic resources, additional user personal identifiable information (PII) of the user based at least in part on the user-specific profile map data structure;
iteratively classify the additional user PII of the user to update the user-specific profile map data structure of the user.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
creating a user-specific profile map data structure of a user that is iteratively updated with user PII; and
receiving by a logic layer processor a request for data related to a specified user;
wherein said specified user authorizing disclosure of said data and actual PII data being made available to a source of said request for data.

2. The method according to claim 1, wherein said user-specific profile map data structure comprises at least a plurality of:
a demographic user-specific parameter,
a psychographic user-specific parameter,
a behavioral user-specific parameter,
a quantitative user-specific parameter, or
any combination thereof.

3. The method according to claim 1, wherein said receiving by a logic layer processor comprises receiving the request from a third-party computing device or from a same computing device.

4. The method according to claim 3, wherein said actual PII data being made available to a source of said request for data being to said third-party computing device or from a same computing device.

5. The method according to claim 1, further comprising said specified user being provided a description or a view of data related to said specified user prior to said specified user authorizing disclosure of said data.

6. The method according to claim 1, further comprising said specified user authorizing disclosure of said data in read only format.

7. The method according to claim 1, wherein said data including pre-defined preference attributes.

8. The method according to claim 1, wherein said data being based on an human-centered data classification scheme.

9. A method, comprising:
iteratively receiving, by a logic layer processor, over a communication network, from a plurality of electronic resources, personally identifiable information (PII) to create a PIIMAP or a portion or derivative of said PIIMAP of a user; and
iteratively analyzing documents containing said PII of said user to create a description of a content of a respective document for inclusion in the respective document.

10. The method according to claim 9, wherein said creating the description relates to the PIIMAP and storing it in the document in a multitude of forms or formats including vectors machine readable vectors or a scannable QR code.

11. A method, comprising:
iteratively receiving, by a logic layer processor, over a communication network, from a plurality of electronic resources, user personal identifiable information (PII) of a user; and wherein user PII comprises a plurality of data elements; and
iteratively classifying, by the logic layer processor, the plurality of data elements of the user PII of the user to iteratively populate a profile map data structure based on a user-centric data classification scheme of a plurality of vector elements to form a user-specific profile map data structure of said user that is iteratively updated with said user PII.

12. The method according to claim 11, wherein the user-specific profile map data structure comprises at least a plurality of:
   a demographic user-specific parameter,
   a psychographic user-specific parameter,
   a behavioral user-specific parameter,
   a quantitative user-specific parameter, or
   any combination thereof.

\* \* \* \* \*